(12) United States Patent
Al-Harbi et al.

(10) Patent No.: US 11,169,720 B1
(45) Date of Patent: Nov. 9, 2021

(54) SYSTEM AND METHOD FOR CREATING ON-DEMAND VIRTUAL FILESYSTEM HAVING VIRTUAL BURST BUFFERS CREATED ON THE FLY

(71) Applicant: Saudi Arabian Oil Company, Dhahran (SA)

(72) Inventors: Razen M. Al-Harbi, Dammam (SA); Mohammed K. Al-Ghuson, Dammam (SA); Osaid F. Hajjar, Dammam (SA); Ali A. Al-Turki, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/931,655

(22) Filed: May 14, 2020

(51) Int. Cl.
| | |
|---|---|
| *G06F 13/00* | (2006.01) |
| *G06F 3/06* | (2006.01) |
| *G06F 16/17* | (2019.01) |
| *G06F 16/188* | (2019.01) |

(52) U.S. Cl.
CPC .......... *G06F 3/0631* (2013.01); *G06F 3/0604* (2013.01); *G06F 3/067* (2013.01); *G06F 3/0659* (2013.01); *G06F 16/1727* (2019.01); *G06F 16/188* (2019.01)

(58) Field of Classification Search
CPC .... G06F 3/0631; G06F 16/1727; G06F 3/067; G06F 3/0604; G06F 3/0659; G06F 16/188
See application file for complete search history.

(56) References Cited

U.S. PATENT DOCUMENTS

| | | | |
|---|---|---|---|
| 9,465,549 B1 * | 10/2016 | Faibish | ................... G06F 3/067 |
| 9,558,208 B1 * | 1/2017 | Faibish | ................. G06F 16/188 |
| 10,049,122 B1 * | 8/2018 | Faibish | ............... G06F 16/1858 |
| 2015/0134780 A1 * | 5/2015 | Weber | ..................... G06F 16/17 709/219 |
| 2018/0081540 A1 | 3/2018 | Aho et al. | |

(Continued)

OTHER PUBLICATIONS

Romanus et al., "Challenges and Considerations for Utilizing Burst Buffers in High-Performance Computing," arXiv reprint arXiv: 1509.05492, 2015, pp. 1-19 (Year: 2015).*

(Continued)

*Primary Examiner* — Jing-Yih Shyu
(74) *Attorney, Agent, or Firm* — Leason Ellis LLP

(57) ABSTRACT

A method for creating a virtual intermediary filesystem on the fly and in real-time on a compute node cluster having a plurality of compute nodes that are running or scheduled to run an application job is provided The method includes initializing a data structure, allocating a plurality of compute nodes, reserving the compute node cluster, distributing the application job, determining memory utilization, determining potential free memory space, marking the potential free memory space, and mapping the marked potential free memory space to create the virtual intermediary filesystem on-demand and in real-time, wherein the virtual intermediary filesystem is arranged to store data in parallel and concurrently from a plurality of computing devices on the compute node cluster and output the stored data to a storage system, wherein the computing devices output the data at a rate that is greater than a maximum write or read data rate of the storage system.

21 Claims, 5 Drawing Sheets

(56) References Cited

U.S. PATENT DOCUMENTS

2018/0232143 A1* 8/2018 Gooding ............... G06F 3/067
2019/0332318 A1* 10/2019 Gooding ............... G06F 3/0643

OTHER PUBLICATIONS

Wang, Teng, et al. "Burstmem: A high-performance burst buffer system for scientific applications." 2014 IEEE International Conference on Big Data (Big Data). IEEE, 2014.
Wang, Teng, et al. "BurstFS: A Distributed Burst Buffer File System for Scientific Applications." The International Conference for High Performance Computing, Networking, Storage and Analysis (SC). 2015.
Xu, Tianqi. Hierarchical, user-level and on-demand filesystem. No. HuronFS; 005160WKSTN00. Lawrence Livermore National Lab. (LLNL), Livermore, CA (United States), 2016. https://www.osti.gov/biblio/1343933. Accessed May 13, 2020.
W. Yu and K. Mohror, "Final Report for File System Support for Burst Buffers on HPC Systems," Lawrence Livermore National Laboratory, Nov. 28, 2017 ("FSU report").
Francois Tessier et al: Dramatically Provisioning Cray DataWarp Staprage, Arxiv.org, Cornell University Library, 201 ; Olin Library Cornell University Ithaca, NY 14853, Nov. 27, 2019; Sections I-III, 9 pages.
Yo-Tong Lu et al., Design and Implementation of the Tianhe-2 Data Storage and Management System, Journal of Computer Science and Technology, Science Press, Beijing, CN, vol. 35, No. 1, Jan. 2020, pp. 27-46.
ISR and Written Opinion of counterpart PCT application PCT/US2021/032429, dated Jul. 29, 2021, 11 pages.

* cited by examiner

SYSTEM AND METHOD FOR CREATING ON-DEMAND VIRTUAL FILESYSTEM HAVING VIRTUAL BURST BUFFERS CREATED ON THE FLY

FIELD OF THE DISCLOSURE

The present disclosure relates to a system, method or computer program for creating or operating an on-demand virtual filesystem that includes virtual burst buffers that can be created on the fly in a compute node cluster.

BACKGROUND OF THE DISCLOSURE

Burst buffers are commonly used in high-performance computing (HPC) environments, such as, for example, scientific applications, that process large amounts of data stored in back-end storage systems. Burst buffers are typically built as multiple parallel arrays of costly high-performance storage (HPS) devices positioned between front-end processors carrying out high-performance computing and back-end storage systems that hold massive amounts of data used by the front-end processors. The HPS devices are typically expensive solid-state devices (SSDs) or non-volatile random-access memories (NVRAMs) that are positioned in parallel as an intermediate layer between the front-end computing processors and back-end storage systems.

The inventors have found that, regardless of the burst buffer architecture used, current parallel filesystems, including burst buffer technologies, suffer from a variety of limitations. The present disclosure provides a system, method and computer program that addresses and obviates those limitations, as well as others existing in parallel filesystems and burst buffer architectures.

SUMMARY OF THE DISCLOSURE

The disclosure provides a solution that includes creating or operating an on-demand virtual intermediary filesystem having virtual burst buffers that can be created on the fly in a compute node cluster. The solution addresses or obviates limitations of parallel filesystems and burst buffer technologies, such as, for example, the necessity for addition of costly specialized HPS device hardware (for example, SSDs or NVRAMs), or the requirement that parallel filesystems on existing burst buffers be static and created once rather than being on demand, or where the burst buffer architectures cannot be reconfigured without downtime, or significant amounts of unused memory space.

The solution includes a system, method and computer program for creating or operating an on-demand virtual filesystem on a compute node cluster, including a plurality of virtual burst buffers that can be created on the fly, without any need for costly HPS devices or hardware, such as, for example, SSDs or NVRAMs. In a non-limiting embodiment, the solution comprises a method for creating a virtual intermediary filesystem on the fly and in real-time on a compute node cluster having a plurality of compute nodes that are running or scheduled to run an application job. The method comprises: initializing a data structure for the application job on a computing resource asset in a compute node network; allocating a plurality of compute nodes in the node network to the compute node cluster; reserving the compute node cluster, including the allocated compute nodes, to the application job; distributing the application job across the compute node cluster; determining memory utilization by the application job on the compute node cluster; determining a potential free memory space on a storage device on each of the allocated compute nodes; marking the potential free memory space on each respective storage device on each of the allocated compute nodes; and mapping the marked potential free memory space on each respective storage device into a single namespace to create the virtual intermediary filesystem on-demand and in real-time, wherein the virtual intermediary filesystem is arranged to store data in parallel and concurrently from a plurality of computing devices on the compute node cluster and output the stored data to a storage system, wherein the computing devices output the data at a rate that is greater than a maximum write or read data rate of the storage system.

The method can comprise adding the potential free memory space on the storage device on each of the allocated compute nodes to determine a total free memory space on the compute node cluster.

The method can comprise determining an aggregate free memory space needed to create the virtual intermediary filesystem for the application job.

The method can comprise comparing the total free memory space on the compute node cluster to the aggregate free memory space needed to create the virtual intermediary filesystem for the application job.

The method can comprise allocating an additional compute node in the compute node network to the compute node cluster to create an expanded compute node network when the total free memory space on the compute node cluster is less than the aggregate free memory space needed to create the virtual intermediary filesystem for the application job.

The method can comprise redistributing the application job across the expanded compute node cluster.

The method can comprise writing the data in parallel and concurrently from the plurality of computing devices to the virtual intermediary file system during an input-output phase of the application job.

The method can comprise reading data in parallel and concurrently from the virtual intermediary file system, and outputting the read data to the storage system during a computation phase of the application job.

The method can comprise destroying the virtual intermediary filesystem when the application job finishes running on the compute node cluster.

The method can comprise releasing all nodes in the compute node cluster after the application job finishes running on the compute node cluster.

In a non-limiting embodiment, the solution includes a non-transitory computer readable storage medium, having stored thereon, instructions that when executed by a computing device on a compute node cluster having a plurality of compute nodes that are running or scheduled to run an application job, cause the computing device to perform operations comprising: initializing a data structure for an application job running or scheduled to run on the compute node cluster; allocating a plurality of nodes in a node network to the compute node cluster; reserving the compute node cluster, including the allocated nodes, to the application job; distributing the application job across the compute node cluster; determining memory utilization by the application job on the compute node cluster; determining a potential free memory space on a storage device on each of the allocated nodes; marking the potential free memory space on each respective storage device on each of the allocated nodes; and mapping the marked potential free memory space on each respective storage device into a single namespace to create the virtual intermediary filesystem on-demand and in real-time, wherein the virtual intermediary filesystem is arranged to store data in parallel and concurrently from a plurality of computing devices on the compute node cluster and output the stored data to a storage system, wherein the computing devices output the data at a rate that is greater than a maximum write or read data rate of the storage system.

In the non-transitory computer readable storage medium, the instructions, when executed by the computing device, can cause the computing device to perform a further operation comprising: adding the potential free memory space on the storage device on each of the allocated nodes to determine a total free memory space on the compute node cluster.

In the non-transitory computer readable storage medium, the instructions, when executed by the computing device, can cause the computing device to perform a further operation comprising determining an aggregate free memory space needed to create the virtual intermediary filesystem for the application job.

In the non-transitory computer readable storage medium, the instructions, when executed by the computing device, can cause the computing device to perform a further operation comprising comparing the total free memory space on the compute node cluster to the aggregate free memory space needed to create the virtual intermediary filesystem for the application job.

In the non-transitory computer readable storage medium, the instructions, when executed by the computing device, can cause the computing device to perform a further operation comprising allocating an additional node in the node network to the compute node cluster to create an expanded compute node network when the total free memory space on the compute node cluster is less than the aggregate free memory space needed to create the virtual intermediary filesystem for the application job.

In the non-transitory computer readable storage medium, the instructions, when executed by the computing device, can cause the computing device to perform a further operation comprising redistributing the application job across the expanded compute node cluster.

In the non-transitory computer readable storage medium, the instructions, when executed by the computing device, can cause the computing device to perform a further operation comprising writing the data in parallel and concurrently from the plurality of computing devices to the virtual intermediary file system during an input-output phase of the application job.

In the non-transitory computer readable storage medium, the instructions, when executed by the computing device, can cause the computing device to perform a further operation comprising: reading data in parallel and concurrently from the virtual intermediary file system; and outputting the read data to the storage system during a computational phase of the application job.

In the non-transitory computer readable storage medium, the instructions, when executed by the computing device, can cause the computing device to perform a further operation comprising destroying the virtual intermediary filesystem when the application job finishes running on the compute node cluster.

In the non-transitory computer readable storage medium, the instructions, when executed by the computing device, can cause the computing device to perform a further operation comprising releasing all nodes in the compute node cluster after the application job finishes running on the compute nod cluster.

In a non-limiting embodiment, the solution includes a system for creating a virtual intermediary filesystem on the fly and in real-time on a compute node cluster having a plurality of compute nodes that are running or scheduled to run an application job, wherein each of the plurality of compute nodes has a computing device and a storage device. The system comprises a computing resource asset arranged to: initialize a data structure for the application job in a node network; allocate a plurality of nodes in the node network to the compute node cluster; reserve the compute node cluster, including the allocated nodes, to the application job; distribute the application job across the compute node cluster; determine memory utilization by the application job on the compute node cluster; determine a potential free memory space on the storage device on each of the allocated nodes; mark the potential free memory space on each respective storage device on each of the allocated nodes; and map the marked potential free memory space on each respective storage device into a single namespace to create the virtual intermediary filesystem on-demand and in real-time, wherein the virtual intermediary filesystem is arranged to store data in parallel and concurrently from a plurality of computing devices on the compute node cluster and output the stored data to a storage system, and wherein the computing devices output the data at a rate that is greater than a maximum write or read data rate of the storage system.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

Figure 1:
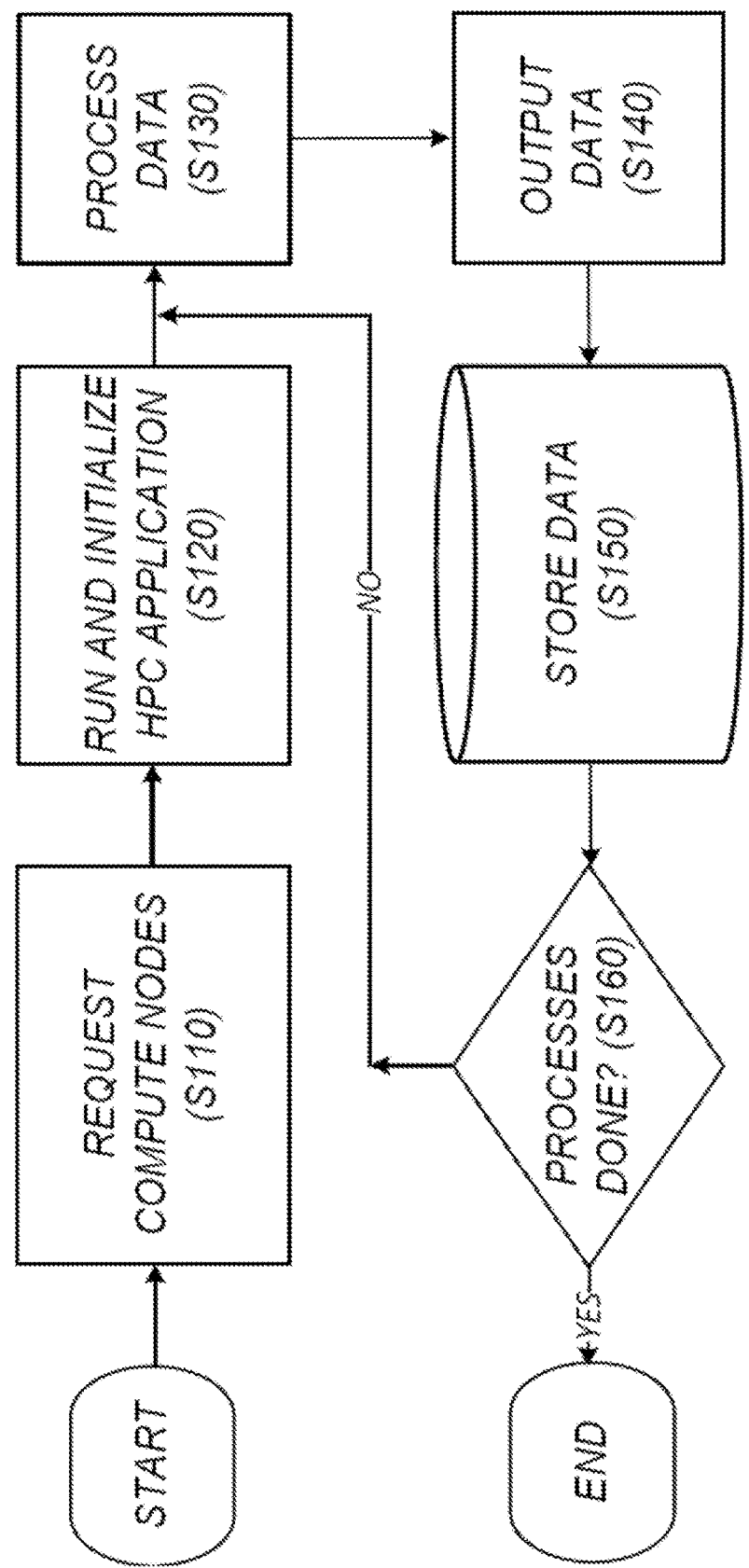
FIG. 1 shows an example of a flow diagram for running an application such as an HPC application on a compute node cluster.

The present disclosure is further described in the detailed description that follows.

DETAILED DESCRIPTION OF THE DISCLOSURE

The disclosure and its various features and advantageous details are explained more fully with reference to nonlimiting embodiments and examples described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques can be omitted so as not to unnecessarily obscure the embodiments of the disclosure. The examples used are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

High-performance computing (HPC) applications can be run on a node network that span hundreds, thousands or more nodes. Each node can include, for example, a compute core or machine that can operate in a cluster of compute nodes that are allocated to collaboratively solve a specific problem. In most cases, the problem domain can be decomposed into smaller subproblems that can be solved independently and in parallel. A solution for the global problem can be coordinated between all subdomains. All or some of the nodes participating in the node cluster in solving the problem may need to write their outputs permanently to a storage system, such as, for example, a back-end storage system that can be exposed to the HPC application via an intermediate filesystem. Because of the parallel nature of HPC application processes, the filesystem itself needs to be parallel to allow read/write by multiple application processes running in the compute node cluster concurrently.

A separate parallel filesystem (PFS) comprising a cluster of storage nodes can be provided between the compute node cluster and back-end storage system to bridge the performance gap between the compute nodes and back-end storage system. The PFS can include hardware such as, for example, a network of connections and communication links between the compute nodes and the storage nodes in the PFS. The PFS can include a distributed filesystem designed to receive concurrent read/write access requests by multiple processes from multiple applications or the same application running on different compute nodes. The PFS can be arranged to simultaneously receive blocks of data and distribute the data across a plurality of storage devices in the back-end storage system, such as, for example, storage servers, each containing a permanent storage device. The computational efficiency of an HPC application can depend on the amount of data and the frequency or rate at which the data is output or input by the application processes, or the performance of the PFS and its underlying storage devices. If a PFS has a maximum capacity or write/read rate that is lower than the operating data capacity or write/read rate of the compute node cluster (CN cluster), the PFS will not be able to keep up with the large amounts of data flowing from/to the CN cluster and will bottleneck dataflow for HPC application processes, thereby idling the application for periods of time and wasting valuable computing resources, instead of allowing the application to perform useful computation. To avoid this serious problem, existing PFSs include a network of storage nodes, each including one or more high-performance storage (HPS) devices such as, for example, SSDs or NVRAMs. However, such PFSs are costly to implement, require a large physical footprint, and consume a large amount of electrical power to operate.

The on-demand solution provided in this disclosure alleviates or mitigates the shortcomings or disadvantages of PFS by providing a virtual intermediary filesystem (VIFS) that can be created on the fly and in real-time in the compute node cluster. The on-demand VIFS can operate as an intermediary storage solution between the higher-data-rate computing devices in the cluster of compute nodes and the much lower-data-rate back-end storage system, thereby avoiding or minimizing idling of an application job running on the computing devices due to bottlenecking of dataflow between the high-performance computing devices and much slower storage devices in the back-end storage system, while increasing input-output (IO) rates and storage utilization. The solution can obviate or minimize any need for HPS devices or a separate PFS formed with HPS devices. The solution can obviate or minimize any need for a PFS made up of a network of storage nodes that are separate from the compute nodes used to run the application.

HPC environments frequently use fast PFSs between front-end computing processes and back-end storage systems to bridge the ever-increasing performance gap between the processing speeds of compute nodes and lower-data-rate input-output (IO) storage systems. A PFS can be built using a network of storage nodes comprising HPS devices, such as, for example, solid-state drive (SSD) devices or non-volatile random-access memory (NVRAM) devices. While HPS devices can offer high aggregate input-output (IO) bandwidths when compared to traditional storage devices, the HPS devices can present significant challenges or disadvantages when used with many practical applications in an HPC environment.

The HPS devices can be arranged in either a node-local architecture or a centralized shared architecture. In the former, each storage node in the PFS can have its own local burst buffer in the form of an SSD or NVRAM storage device, and all local HPS devices can be aggregated into a global namespace. This architecture can scale linearly both in space and performance by adding more local storage nodes, each having an HPS device, at the expense of linearly increasing cost. Hence, for large scale applications, this architecture can become prohibitively expensive to implement in terms, for example, hardware costs, power consumption, cooling requirements, or physical space requirements for the requisite larger footprint, resulting in a cost-per-computation that can render the PFS impractical for many applications or users.

On the other hand, a centralized shared PFS architecture can consolidate an array of HPS devices, such as SSDs or NVRAMs, into a pool of storage nodes, each comprising an HPS device, to provide a more cost-effective approach, since the shared pool of storage nodes does not have to be scaled linearly with addition of more compute nodes to a compute node cluster. In other words, the size or capacity of the storage nodes (including HPS devices) can be independent of the computing capacity of the compute node cluster. However, this architecture can have significant performance limitations when write/read requests have to travel through a computer network, such as, for example, from a designated writer/reader in the compute node cluster to an HPS device in the storage node pool, or vice-versa, thereby causing the application processes on the compute node cluster and, resultantly, application job to remain idle for periods of time.

Since HPS devices can be prohibitively expensive to implement, and they suffer from numerous limitations that make them impractical or disadvantageous to use in many practical applications, an urgent and unfulfilled need exists for the solution provided by this disclosure, which addresses or obviates such limitations and others. For instance, the solution mitigates or obviates limitations relating to implementation of PFSs that use separate storage node architectures, as well as PFS that use HPS devices, including, for example:
- the requirement for specialized storage devices that are prohibitively expensive, especially for node-local architectures in large scale installations;
- the requirement that the devices be limited to parallel filesystem architectures that are static and can be only created once rather than being creatable on-demand;
- the requirement for a parallel filesystem creation process that is fundamentally part of the device architecture design and usually cannot be reconfigured without downtime;
- the requirement for larger physical footprints to contain additional hardware required by separate storage node clusters; and
- the additional power consumed in operating or cooling the additional storage nodes.

The solution avoids or mitigates such limitations of storage node clusters generally, and, more specifically, storage node having HPS devices, as well as other limitations that will be apparent to those skilled in the art after reading this disclosure.

The solution provides a system, method and computer program for creating, operating and destroying a VIFS using existing storage for virtual burst buffers (VBBs) in each node of a compute node cluster. The VIFS can be created on the fly on existing storage devices in the CN cluster, without require separate storage nodes. Each node in the CN cluster can have a computing resource asset (for example, CRA 40, shown in FIGS. 2 and 3, discussed below). The CRA can include, among other things, a computing device (for example, CD 44, shown in FIGS. 2 and 5, discussed below), such as, for example, one or more processors, each having one or more cores, as commonly used in HPC environments for running HPC applications. The VIFS can be created or operated on-demand and in real-time, such as during an application's runtime. The agility of the on-demand VIFS can materialize in an ability to tune or customize each CRA in the CN cluster to an optimum configuration for each application during its runtime, where most, if not all input-output (IO) parameters can be identified. The VIFS can be created and operated as an intermediary storage layer in the CN cluster, and logically located between the application processes running on the computing devices in the CN cluster and the external storage system that operates as permanent (or temporary) storage for the data output from the application processes running on the CN cluster, thereby providing a timely storage solution that can bridge the IO performance gap between high-speed computing devices in the CN cluster and the much slower or lower IO data-rate storage system that can be connected to the CN cluster through a network, without requiring separate storage nodes or any specialized hardware such as HPS devices.

The life cycle for processes of an application, such as, for example, an HPC application, can alternate repeatedly between a computation phase and an IO phase. After each round of computation in the computation phase, all processes of the application may need to concurrently write/read their intermediate data to/from the storage system. The inventors have observed that certain HPC applications, such as, for example, engineering, scientific or industrial, including numerical oil and gas reservoir simulation applications, can spend on average about 20% or more of their time performing input-output (IO) operations. The on-demand VIFS can drastically reduce the IO time required by such applications, while fully utilizing available CRAs in the CN cluster, including storage space at each node in the CN cluster, without needing to use separate storage nodes or HPS devices. The solution can drastically reduce IO time while minimizing or eliminating unutilized or underutilization CRAs in the CN cluster by creating or operating the VIFS on-demand and in real-time in the CN cluster, and logically positioning the VIFS between the computing devices in the CN cluster and the much slower or lower write/read data rate storage system that can connect to the CN cluster.

The VIFS can be created or operated by creating or operating a plurality of virtual burst buffers (VBBs) on the fly and in real-time on the compute nodes in the CN cluster, using existing storage devices in the CRAs in the CN cluster. Each VBB that is created on the fly on a compute node can write/read data from/to the process running on the same or a different compute node in the CN cluster, thereby allowing the application job running on the computing devices in the CRAs to immediately proceed to the next computation phase after each IO phase, without any idle time.

The data in each VBB of the VIFS can be asynchronously and concurrently transferred from the VIFS to corresponding storage devices (not shown) in the storage system. The data can be transferred in parallel from the VIFS to the storage system at the same time the next round of computation is being carried out by the application processes running on the CN cluster. The solution can be arranged to leverage unused storage space on each CRA in the CN cluster, without incurring any extra cost or requiring separate storage nodes or HPS devices like SSDs or NVRAMs. The solution can create the VIFS on-demand and on the fly, in real-time, in a user space when needed by an application, without needing any special configuration, service downtime, or administrative privileges.

Unlike existing PFSs that typically require separate storage nodes having homogenous storage devices, the VIFS can utilize existing CRAs in CN clusters that have storage devices with storage imbalances or heterogeneous storage availability. The on-demand VIFS can be created or operated to fully utilize each CRA on the CN cluster for accelerating IO performance by employing underutilized or unused storage space in the compute nodes to create the VIFS on the fly and in real-time, without incurring any extra capital or operational cost. By significantly reducing IO time for HPC applications, the on-demand VIFS can provide better application turn-around time, as well as full implementation of available resources and services in the CN cluster to minimize cost-per-computation and maximize IO performance by minimizing or eliminating non-utilization or underutilization of storage capacity in the CN cluster.

Figure 5:
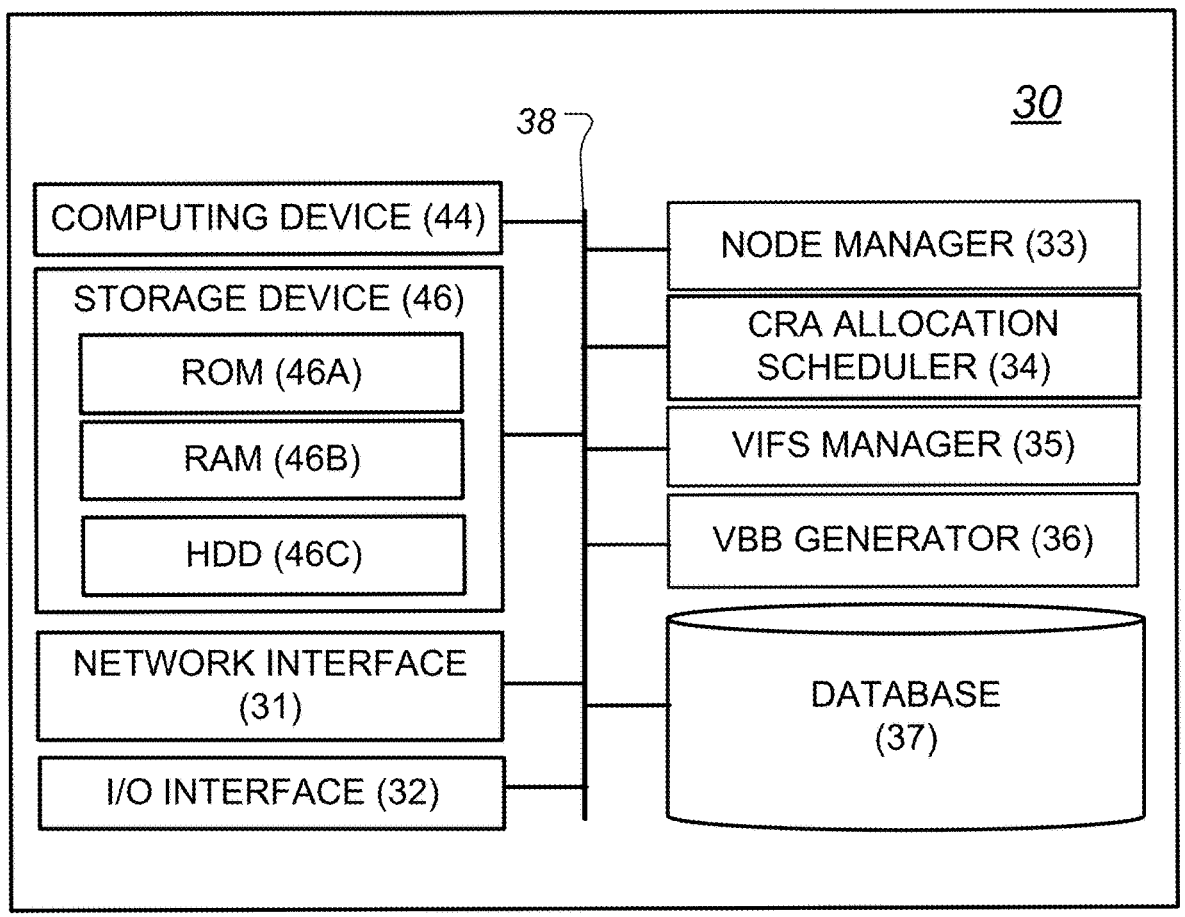
FIG. 5 shows a nonlimiting embodiment of an on-demand VIFS system, constructed according to the principles of the disclosure.

In the HPC environment of the CN cluster, an HPC application can run in an exclusive manner, reserving a set of compute nodes in a node network to the exclusion of all other applications, and prohibiting any other application from using the same compute nodes until that application terminates and the compute nodes are returned to a computing resource asset (CRA) allocation scheduler (for example, 34, shown in FIG. 5). The storage profile for the application running on the CN cluster can vary significantly from that of other applications, for example, based on the scalability nature of the application or the size of the global problem. If an application job is highly scalable, the problem can be divided further into smaller subproblems. Accordingly, the storage profile of an application per-compute node can vary drastically and, in certain instances, can become low, resulting in inefficient and wasteful underutilization of storage space in the compute nodes in the CN cluster. The on-demand VIFS mitigates or eliminates such inherent limitations or disadvantages that can occur when running different applications on the same compute node network.

Furthermore, since applications can allocate all their data structure prior to computational processing, such as, for example, numerical crunching, and determine their storage consumption immediately after the initialization phase, an application job might reserve unnecessarily large amounts of storage space that might far exceed actual usage by the application processes. The solution provided here addresses such wasteful underutilization of available storage capacity that can, if not for the solution, result in the application being idle as a result of bottlenecking in the dataflow between the CN cluster and the storage system that stores data from the CN cluster, while underutilizing or wasting costly resources.

Figure 3:
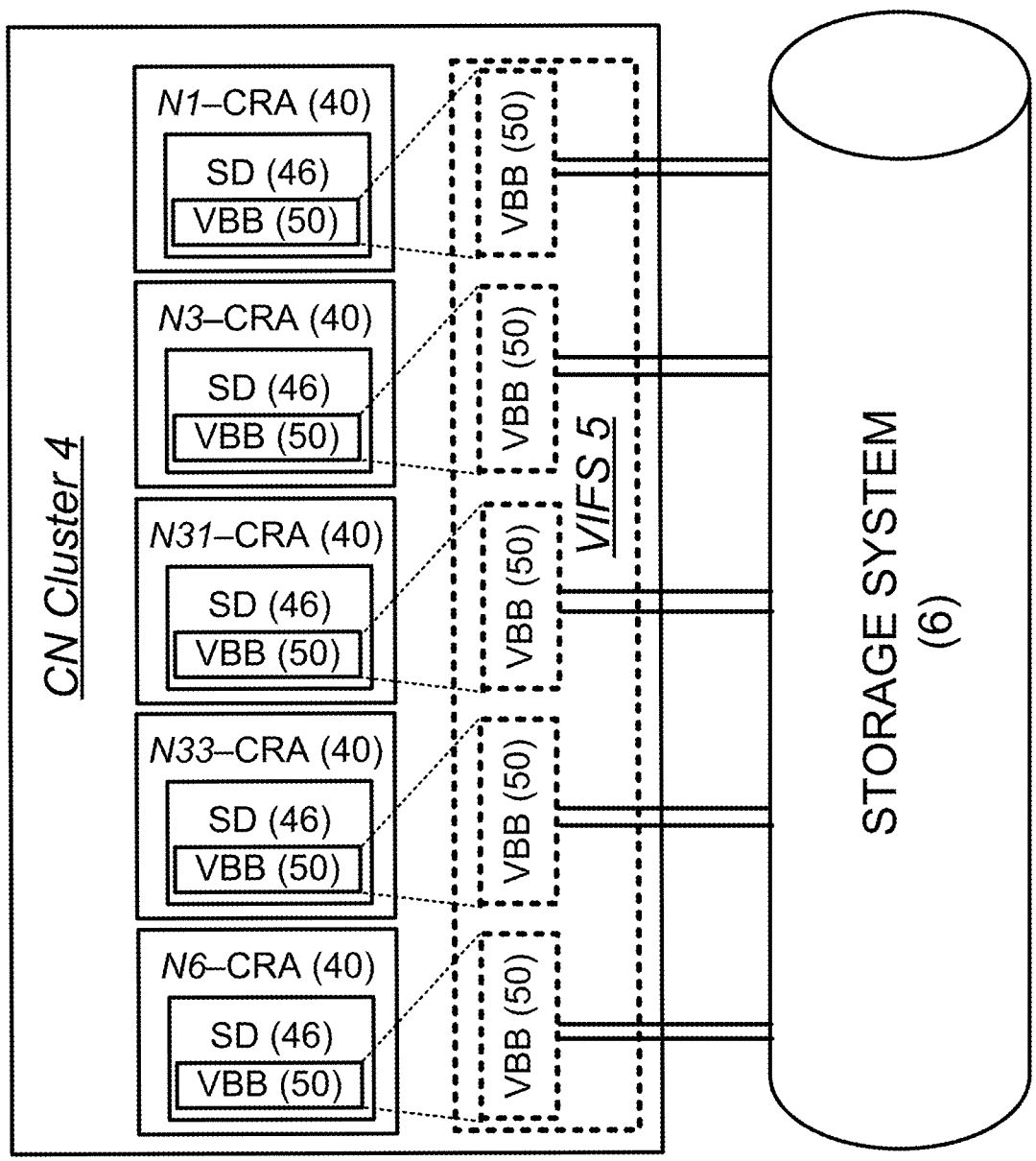
FIG. 3 shows a nonlimiting embodiment of the VIFS in FIG. 2 created according to the principles of the disclosure, including a plurality of virtual burst buffers created on the fly in the compute node cluster.

The solution overcomes such inherent limitations by creating or operating a VIFS on-demand and on the fly in real-time for each application job, using unutilized or underutilized memory in each storage device (for example, SD 46, shown in FIG. 3) in the CN cluster, such as, for example, the CN cluster 4, including compute nodes N1, N3, N31, N33, and N6 (shown in FIG. 3). The on-demand VIFS can use unutilized or underutilized memory on each CRA in the CN cluster running the application to accelerate that application's IO operations. The VIFS can leverage underutilization of storage space by an HPC application job that may fully utilize the computing power of the computing devices in the CN cluster without fully utilizing the storage space in the same CN cluster. The VIFS can be created or operated by creating or operating a VBB on the fly and in real-time in each compute node that has VBB capacity, thereby bridging the IO performance gap between the computing devices in the cluster and the slower or lower-bandwidth back end storage system (for example, 6, shown in FIG. 3). The solution can leverage this characteristic of HPC applications by fully utilizing all resources and services on the CN cluster, including computing power and storage space.

As previously noted, the CN cluster can include, for example, tens, hundreds, thousands, or more unique compute nodes that can be selected or allocated by the CRA allocation scheduler (for example, 34, shown in FIG. 5) to run an equal or greater number of processes of an HPC application job on the CN cluster. The VIFS can be created on-demand and on the fly in the cluster, thereby fully utilizing all storage space, as well as computing power in the CN cluster.

The VIFS can be created on the fly and in real-time based on the particular application job running on the CN cluster. The VIFS can be created and tailored to each application job running on the CN cluster. The VIFS can be created by creating a VBB on the fly and in real-time on each node (or less than all nodes) using free memory on the compute node and creating a mount point for that VBB. Each VBB can be arranged to operate as an intermediary storage between the application process running on the same or different compute node in the CN cluster and a corresponding storage device (not shown) in the storage system (for example, 6, shown in FIG. 3).

In the solution, if the available storage space in any compute node in the CN cluster is determined to be insufficient to create a VBB on that node, the solution can scale-out and allocate or include one or more additional compute nodes in the CN cluster to create a scaled-out or expanded CN cluster and further distribute or redistribute the computing workload of the application processes, thereby freeing up additional storage space on the compute nodes to create the required VBBs for the VIFS. Each VBB can be arranged to input and write data from or read and output data to the application process running on the computing device on the same (or different) compute node during the IO phase of the application processes. Each VBB can be arranged to read and output data to, or input and write data from the storage system during the computational phase of the application processes.

The on-demand VIFS does not require an application to dictate its IO requirements a priori, rather it allows the application to dynamically decide whether to use available storage space in the nodes as a VBB, or not. In the case of HPC applications, knowing IO requirements for an application's processes can be extremely challenging, especially the amount or rate of data the processes might output or input. Furthermore, even where the application can determine its IO requirements beforehand, the application can benefit from the on-demand VIFS since it can be created on the fly and in real-time according to the application's needs, thereby preventing the application processes from becoming idle due to lack of sufficient resources while necessary resources (for example, additional storage space) are accumulated for the application to perform its computation or IO phases.

The VIFS can be created in a single namespace, thereby allowing the application running on the CN cluster to fully utilize the entire free storage space in the cluster as VBBs in the VIFS. The on-demand VIFS does not require any prior knowledge about the physical nodes or their allocation, since the VBBs and, therefore, the VIFS can be created dynamically at run time in the application space after the nodes are selected or allocated for the application processes. In the solution, nodes and their configurations are neither predefined nor require different hardware configurations. Accordingly, an application can submit a job comprising hundreds of processes to an equal number of compute nodes in the CN cluster, then, when all the nodes start executing the workload, a VBB can be created at each node at the discretion of the application, if needed.

The solution can include a system, method or computer program for determining available storage space on each node of the CN cluster. The solution can include application-based VBB creation, where the application can assess the storage space available on each compute node in the CN cluster on a per-node basis. The on-demand VIFS can include a centralized approach or distributed approach to accomplish this.

In the centralized approach, the application, while running on one or more CRAs in the CN cluster, can build a global view of the free storage space on each compute node on the fly at runtime using any message exchange protocol, including, for example, Message Passing Interface (MPI). Then, the CRA allocation scheduler (for example, 34, shown in FIG. 5) can decide how much storage space it will allocate on each node for a VBB.

In the distributed approach, the CRA on each node can decide, within the application space, how much storage space it can avail to a VBB.

Irrespective of the policy used, each node's storage space can be softly marked for the potential maximum space the VBB can utilize without interfering with the application space. The amount of storage space contributed to the VBB by each compute node can be variable; a node can contribute a large portion of its memory while another contributes nothing. The solution does not assume any specialized hardware or even abundance of storage space on each node.

Rather, the solution allows the application, running on the CRAs, to decide at runtime to use some of the compute node's unutilized memory as a VBB.

The solution does not require that the amount of memory be pinned on any of the nodes on the cluster prior to starting an application job. Rather, each node can contribute a maximum potential storage capacity (VBB capacity) for creation of the VBB. This part of the storage space can be softly marked on each node to form part of the VIFS.

For instance, in a nonlimiting example, when application job A starts and the application's memory footprint is determined, the CRAs running the application processes for the job can calculate the maximum memory needed on each node for the application to run. The remaining free memory on each node can be marked as maximum potential VBB capacity. The aggregate free storage space can be used to create the VIFS on-demand and on the fly in real-time.

Accordingly, if the CN cluster has 4 compute nodes on which job A is running, each node having a storage device with, for example, 64 gigabytes (GB) of random access memory (RAM), and the application processes running on these nodes need 30 GB on each node, then the solution can create a VIFS having 136 GB (34 GB×4=136 GB), with a 34 GB VBB being created on each node. It is noted that the VIFS can start with 0 GB and grow dynamically until each VBB hits its soft mark for the maximum storage space.

The solution can be arranged to map each available storage space into a single namespace to create the VIFS. For instance, after each node's storage space is marked, a distributed VIFS can be created and mounted on all nodes in the CN cluster for a single namespace view on all compute nodes. In contrast to an approach that might assume the existence of a predefined burst buffer, in this solution, the VIFS exposing each VBB can be aware of each potential storage space on all nodes. The on-demand VIFS can be composed with a total single namespace capacity by aggregating storage spaces on all nodes in the CN cluster. The on-demand VIFS can be arranged to equally utilize the storage space on each node in the cluster during data read/write to balance the load/storage space on all VBBs in the VIFS.

For instance, in the previous nonlimiting example, the VIFS with a 136 GB capacity can be created by aggregating 34 GBs from each node in the cluster. Once the VIFS is created, a shared mount point (for example, "/mountVIFS") can be created on each node in the CN cluster. The newly created VIFS can be mounted on this mount point. Once successful, the application processes can read/write their data to that mount point as a normal file system. For example, if an application processes wants to write to a file named "OUTPUT," the path of the file would be "/mountVIFS/OUTPUT."

The solution can be arranged to use any file system that can be managed in a user space. The solution can create a VIFS on the fly and in real-time for each application job, if requested. The VIFS can be configured independently and tailored for each application's storage needs. The solution can be arranged to utilize the VIFS to stitch all memory fragments contributed by each node and act as a single namespace VIFS. The VIFS and its associated namespace can be unique for each application job and made accessible from all nodes allocated for that job. Accordingly, the namespace can be unique for each VIFS and the application job running on the nodes. This means namespace conflicts are virtually impossible in the CN cluster.

In a nonlimiting example, application jobs A and B can create two distinct VIFSs, for example, "VIFS1" and "VIFS2." Since the nodes allocated for each job are used for that job only, and because each job has its own VIFS, both jobs A and B can use the same mount point names. For example, both jobs A and B can create a mount point named "/mountVIFS" and it would not create any conflict. This is because the VIFS and its associated file system can be totally different, and the nodes can be mutually disjoint.

In the solution, a distributed VIFS can be created when an application job starts on the CN cluster, and the VIFS can be destroyed when the job is finished. The solution can include a node manager (for example, 33, shown in FIG. 5) that can manage the nodes in the CN cluster during job execution. The node manager can be arranged to distribute or redistribute the workload of an application job across a CN cluster, to keep track of each node's memory allocation, direct each write to the best node or handle all metadata operations.

FIG. 1 shows a nonlimiting example of a process 100 for running an application such as an HPC application on the CN cluster. The process 100 can begin with the application's inception and ends with the termination of all processes in the application job running on the nodes. The reserved nodes in the CN cluster can be released to a node manager (for example, 33, shown in FIG. 5) when the job terminates. The application can start and provide a computing resource asset (CRA) request that includes the number of compute nodes (or CRAs) needed to run an application job (Step 110). The application can initialize on the CN cluster with, for example, a job script that includes the CRA request. The CRA request can include, for example, parameters, environment variables, description of CRAs needed to run the application job, and input directives and output directives.

Figure 2:
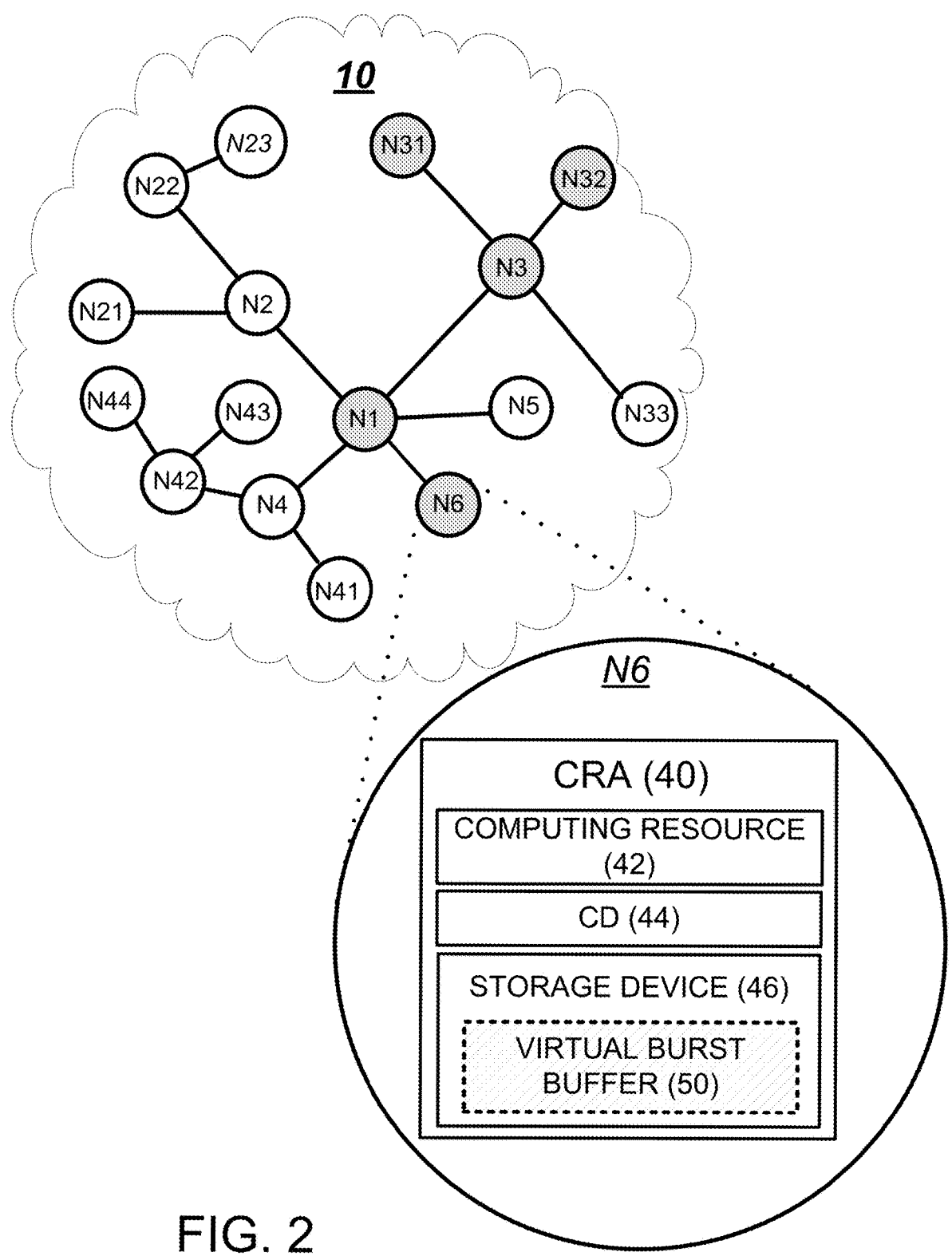
FIG. 2 shows an example of a node network with a compute node cluster comprising a nonlimiting embodiment of a virtual filesystem.

FIG. 2 shows a nonlimiting example of a compute node network 10 from which a plurality of compute nodes (for example, N1, N3, N31, N32, and N6) can be selected or allocated to the CN cluster 4 (shown in FIG. 3) to run the application. The node network 10 can include tens, hundreds, thousands, hundreds of thousands, or more compute nodes N. Each compute node N in the node network 10 can include a computing resource asset (CRA) 40. The CRA 40 can include a computing resource 42, a computing device 44 and a storage device 46. Each CRA 40 in the CN cluster can be arranged to create or operate a VBB 50 on-demand.

Referring to FIGS. 1 and 2 concurrently, the CRA request for the application (for example, in Step 110, FIG. 1) can ask that a specific number (for example, five) compute nodes N be allocated to the CN cluster to run the application job, in which case the CRA allocation scheduler 34 (shown in FIG. 5) can allocate, for example, compute nodes N1, N3, N31, N32, and N6 in the node network 10 to form the CN cluster that will run the application job. In this nonlimiting example, the node network 10 includes compute nodes N1, N2, N21, N22, N23, N3, N31, N32, N33, N4, N41, N42, N43, N44, N5 and N6, any of which can be allocated to form a CN cluster that will run a particular application job.

Each node in the node network 10 can be arranged to interact with an on-demand VIFS system 30 (shown in FIG. 5). In a nonlimiting embodiment of the solution that includes a distributed VIFS architecture, the VIFS system 30 can be included in each node in the node network 10. Alternatively, in a nonlimiting embodiment of the solution that includes a centralized VIFS architecture, the VIFS system 30 can be located at one or more nodes in the node network 10, which can be included in the CN cluster or located outside the cluster on the node network 10. In either embodiment, the VIFS system 30 can be arranged to create, operate or destroy a VIFS on the fly for each application job.

The number of compute nodes N allocated to the CN cluster for an application job can depend on the computing requirements of that job and its operational constraints. Each allocated node in the CN cluster can include space in the storage device 46 on that node that can be exclusively reserved for the particular job reserving it. The storage space in each node can be substantially, if not entirely unused and available to store data at the beginning of the application job. Once the application job begins to run and initialize (Step 120), and the application processes start executing on the allocated nodes in the CN cluster 4 (shown in FIG. 3) (Step 120), memory space on each storage device 46 (shown in FIGS. 2 and 3) can be allocated to accommodate data structures needed for the computation phase of the job, such as, for example, numerical crunching. The memory space allocation can be done at the beginning of the job's execution, and the storage space can be recycled during the computation phase of the job. The application processes can require nominal extra storage space for auxiliary data generated during the computation phase.

As the application processes run and the underlying computing devices 44 (shown in FIGS. 2 and 5) compute large amounts of data on the allocated nodes (for example, N1, N3, N31, N32 and N6, shown in FIGS. 2 and 3) (Step 130), each node can output (or input) its intermediate results concurrently with the other allocated nodes (Step 140) for storage in the form of data bursts (Step 150). In other words, the application processes conduct computation, such as, for example, number crunching, on the computing devices 44 (shown in FIGS. 2 and 5) during the computation phase of the job and output intermediate results data during the IO phase, and, then, the application processes reconvene to the computation phase again. If all processes in the application job are completed (Yes at Step 160), then the job terminates and all reserved nodes in the CN cluster can be released to the node manager 33 (shown in FIG. 5), otherwise the allocated nodes in the CN cluster 4 (shown in FIGS. 2 and 3) can continue to process (Step 130), output (Step 140) and store data (Step 150).

As previously noted, since the rate at which the storage system 6 (shown in FIG. 3) is able to write data to underlying storage devices (not shown) can be significantly lower than the rate at which the computing devices 44 (shown in FIGS. 2 and 5) in the CN cluster output the data to the storage system 6, the solution can create the VIFS 5 (shown in FIG. 3) on the fly between the computing devices 44 and the storage system 6 to avoid formation of a dataflow bottleneck between the CN cluster 4 and storage system 6 that could cause the application processes to become idle while data is transferred between the CN cluster 4 and the storage system 6.

The node network 10 includes an embodiment of the solution, including a nonlimiting embodiment of the VIFS system (for example, 30, shown in FIG. 5) that is arranged to create, operate and destroy a unique VIFS for each application job, on-demand, on the fly and in real-time, when it is needed. In this nonlimiting example, the VIFS 5 (shown in FIG. 3) can be created on the fly using free storage space on the nodes N1, N3, N31, N32, and N6 that make up the CN cluster 4 (shown in FIG. 3). The CRA 40, which can include the VIFS system 30 (shown in FIG. 5), can be arranged to create the VIFS 5 by marking and operating a virtual burst buffer (VBB) 50 on the free memory of each node in the CN cluster 4. Since HPC applications typically underutilize their allocated memory, the solution can leverage the unused storage capacity on each node of the CN cluster to create or operate a respective VBB on the storage device of such node in the CN cluster, thereby minimizing 10 overhead and fully utilizing the allocated CRA 40 (shown in FIGS. 2 and 3) on each node in the CN cluster.

If a particular CRA 40 (for example, at node N6, shown in FIGS. 2 and 3) does not have adequate storage space to accommodate creation or operation of the VBB 50, the solution can scale-out and allocate one or more additional compute nodes in the node network 10 (for example, node N4) to create or free up additional storage capacity. The application job workload can be distributed or redistributed amongst the nodes in the expanded CN cluster (for example, nodes N1, N3, N4, N31, N32, and N6). This way the aggregate available storage space in the resultant, expanded CN cluster will be increased to accommodate creation or operation of the necessary VBBs 50 to create or operate the VIFS in the CN cluster.

The computing resource 42 can include a section of code or instructions of an application allocated to run on that CRA 40. The computing resource 42 can include sections of code or instructions that, when executed on the computing device 44, can cause the CRA 40 to carry out the process 100 (shown in FIG. 1) or process 200 (shown in FIG. 4). The computing resource 42 can include, for example, a software application, a computer program, an application program interface (API), a library, or any other computer-readable or executable instructions or code needed to carry out the full spirit and scope of this disclosure, as will be understood by those skilled in the art.

The computing resource 42 can be stored on a non-transitory tangible computer-readable medium that can be located locally at the CRA 40. The computing resource 42 can be arranged to run on an operating system (OS) kernel as a process, which can include the application process allocated to run on that node. The OS kernel can be arranged to run on the computing device (for example, CD 44, shown in FIGS. 2 and 5) at that CRA 40 and carry out one or more processes.

The computing device (CD) 44 (shown in FIGS. 2 and 5) can include any computing device, such as, for example, a compute core, a compute machine, a central processing unit (CPU), a graphic processing unit (GPU), a general-purpose GPU (GPGPU), a field programmable gate array (FGPA), an application-specific integrated circuit (ASIC), or any other computing device architecture that can be arranged for operation of the CRA 40, which, as noted above, can include the VIFS system 30 (shown in FIG. 5). The OS kernel can be arranged to execute on the CD 44 and have control over operations in the node. The OS kernel can represent the highest level of privilege on the operating system (OS) or the CD 44. The OS kernel can include a driver for each device included in the CRA 40, including the storage device 46.

The CD 44 can be arranged to check and enumerate all processes running on the OS kernel. The CD 44 can be arranged to monitor each process and check each process for all connectivity activity, including to determine whether the process is connecting or attempting to connect to another node in the CN cluster 4 or the storage system 6 (shown in FIG. 3). The CD 44 can be arranged to enumerate every process running on or interacting with the OS kernel, including the process' file path (including, for example, canonical path), process name, and process identification number, which can be generated by the OS kernel for the process.

The CD 44 can be arranged to initiate, manage or terminate connections to or from the process on the OS kernel and other nodes in the CN cluster 4 or storage system 6 (shown in FIG. 3). The CD 44 can be arranged to connect the process to one or more nodes in the CN cluster 4 or storage system 6 (shown in FIG. 3) for the HPC application, and to facilitate data flow between the process and the other node.

In a nonlimiting embodiment, the storage device 46 can include a hard disk drive having a maximum write or read data rate that is significantly less than, for example, 1 GB/s, such as, for example, less than 200 MB/s. Whereas a nonlimiting example of an SSD or NVRAM can have a maximum write or read rate of, for example, greater than 3 GB/s (for example, 3,200 MB/s or greater), which can be about 16 times (16×) or more than that of the hard disk drive. The solution provides for creation of VBBs and, thereby, the VIFS in the CN cluster without needing write/read rates of high-performance storage devices, such as, for example, SSDs or NVRAMs.

It is noted that other maximum write/read rates for the storage device 46 are contemplated by this disclosure, including write/read rates greater than, for example, 1 GB/s or significantly less than 200 MB/s.

The storage device 46, including its non-transitory computer-readable media, can be arranged to provide volatile or nonvolatile storage of data, data structures, or computer-executable instructions or code. The storage device 46 can accommodate storage of any data or code in a suitable digital format. The storage device 46 can include one or more computing resources, such as, for example, program modules or software applications that can be used to execute aspects of the architecture included in this disclosure. One or more computer resources can be stored in the storage device 46, including, for example, the computer resource 42, an application program, an application program interface (API), a program module, program data, or a section of computer-executable instructions or code for the HPC application running on, for example, the CRA 40 (shown in FIG. 2) or VIFS system 30 (shown in FIG. 5). The computer resource can include an API such as, for example, a remote procedure call (RPC) API, a representation state transfer (REST) API, or any other utility or service API. The computer resource can be cached in a RAM (for example RAM 46B, shown in FIG. 5) as executable sections of computer program code or retrievable data.

The CD 44 can be arranged to execute an application process simultaneously while other processes (or jobs) of the application are running on other nodes in the CN cluster (for example, 4, shown in FIG. 3). The computing resource 42 can be arranged to run on an operating system (OS) kernel as a process, which can include the application process allocated to run on that node. Every computing resource 42 can be created, opened, or executed on the operating system, and can create a corresponding process. The OS kernel can be arranged to run on the computing device (for example, CD 44, shown in FIGS. 2 and 5) to carry out one or more processes of the computing resource 42.

The OS kernel can include, for example, a monolithic kernel or a microkernel. The OS kernel can, when a process is triggered, initiate and carry out the process, including allocating resources for the process, such as, for example, memory or storage space, processing time or space, or other services on the storage device 46 at the node. The OS kernel can be arranged to initiate and control transfer of data between the CD 44 and the storage device 46, or between the CD 44 or storage device 46 and another CRA 40 in the CN cluster 4 (shown in FIG. 3). The OS kernel can be arranged to initiate and control transfer of data between the CD 44 or storage device 46 and the storage system 6 (shown in FIG. 3).

The OS kernel can carry out the process by allocating memory or storage space and providing resources to the process. The OS kernel can load or transfer data into the allocated storage space. The OS kernel can execute instructions or interface the process to other processes running on other nodes in the CN cluster 4 (shown in FIG. 3).

The OS kernel can interface to one or more hardware devices (not shown) on the CRA 40 (shown in FIGS. 2 and 3) or VIFS system 30 (shown in FIG. 5), in addition to the storage device 46. The OS kernel can interface with the storage device 46 to store data from the process, or to retrieve data from the storage device 46 for use by the process. The OS kernel can interface with the storage device 46 to create or operate a virtual burst buffer (VBB) 50, which can be created in the storage device 46 by the OS kernel on the fly. The OS kernel can interface with the storage device 46 to transfer data from memory to the CD 44, or from memory to another storage device 46 or CD 44 located at another node in the CN cluster (for example, 4, shown in FIG. 3), or to a storage device (not shown) in the storage system (for example, 6, shown in FIG. 3).

The CRA 40 can include any physical or virtual device or module that can be arranged to connect to or be included in a node in the node network 10. The CRA 40 can include, for example, an IO interface, a transmitter, a receiver, a transceiver, a modulator, a demodulator, a modem, or a communicating device. The CRA 40 can be arranged to connect to other nodes in the node network 10 or an external network (not shown) via a communication link.

The OS kernel can be arranged to control all operations on the CRA 40. The OS kernel can be arranged to control operations of the computing resource 42, CD 44 or storage device 46 at one or more of layers 1 to 7 in the Open System Interconnection (OSI) model. The OS kernel can be arranged to allocate resources or services to the computing resource 42 or storage device 46, enable the computing resource 42 or storage device 46 to share or exchange data, input or output data, protect the resources or services of the computing resource 42 or storage device 46 from other nodes in the node network 10, or enable synchronization amongst the computing resource(s) 42 and storage device(s) 46 in the node network 10. The OS kernel can be arranged to connect the application process corresponding to the section of code or instructions of the application in the computing resource 42 and running in the CRA 40 to one or more application processes running on other nodes in the CN cluster 4 or storage system 6 (shown in FIG. 3).

The OS kernel can be arranged to facilitate interactions between the computing resource 42 and storage device 46 in the same node or one or more other nodes in the node network 10 or storage system 6 (shown in FIG. 3). The CD 44, which can run the OS kernel, can be arranged to arbitrate access to services or the storage device 46 by the process, including, for example, running time on the CD 44. The OS kernel can be arranged to take responsibility for deciding at any time which application process should be allocated to the computing resource 42 or storage device 46. The OS kernel can be arranged to determine whether a request from an application process is appropriate or authorized, such as, for example, a request by a process to connect to another process running on a node in the CN cluster 4 or the storage system 6 (shown in FIG. 3). If the OS kernel determines that a request from the process is appropriate or authorized, the OS kernel can be arranged to carry out the requested action, such as, for example, granting the process access to a computing resource 42, CD 44, storage device 46, or service, such as, for example, a file, data, configuration data, a storage location in the storage device 46, or a connection to a node in the CN cluster 4 or storage system 6 (shown in FIG. 3).

The OS kernel can be arranged to maintain a data structure for the computing resource 42 or storage device 46, including, for example, a description of the state and resources or services owned or requested by the computing resource 42 or storage device 46, thereby enabling the OS kernel to exert control over the computing resource 42 or storage device 46 and corresponding application process. The OS kernel can include a data structure such as, for example, Process Control Block (PCB), Thread Controlling Block (ThCB), Task Controlling Block (TCB), Task Struct, Switchframe or any other data structure suitable for the OS kernel to manage the process for the computing resource 42, including runtime scheduling, memory access, input-output (IO) interface access or performance monitoring.

The data structure for the computing resource 42 can include, for example, process identification data, process state data, process control data, output path data, map data, mount point data or any other data or information, as will be understood by those skilled in the art, that might be necessary to uniquely identify the corresponding application process when running on the OS kernel, transfer or store data, or any other related process running in the CN cluster 4 (shown in FIG. 3). The map data can include, for example, map of nodes or CRAs 40 in the CN cluster 4.

The OS kernel can reference the data structure when determining whether to allow a process to connect to another node in the CN cluster 4 or the storage system 6 (shown in FIG. 3). The process identification data can include a process identifier (or PID) such as commonly used in operating system kernels in, for example, UNIX, macOS® (a trademark of Apple Inc. for a graphical operating system) or Windows® (a trademark of Microsoft for a group of graphical operating system families), to uniquely identify a process running on the OS kernel. The process identification data can be used by the OS kernel as a process parameter in function calls, runtime scheduling, termination, or other actions related to the corresponding process, or other processes that are running according to the application. The process identification data can be used by the OS kernel as a process parameter in a function call, such, as for example, a virtual burst buffer create (VBBC) function in the computing resource 42 to create a VBB 50 in a CRA 40 and, resultantly, in the associated VIFS 5 (shown in FIG. 3). The VBBC function can be arranged to receive a map of all CRAs 40 (or nodes) in the CN cluster 4 (shown in FIG. 3) with their available memory space. The VBBC function can be arranged to return a mount point that can be used to update an output path for outputting data from the CD 44 or storage device 46.

The OS kernel can be arranged to access or modify the data structure (for example, PCB) when managing or executing a process, including scheduling, memory access, IO interface access, performance monitoring, or data output path management. The OS kernel can create or update a status table for the process, including a memory table, an IO device table, or a process table. The memory table can include, for example, information about the allocation of main memory in the storage device 46, or virtual memory in the VBB 50 in the storage device 46 for the process, and authorization attributes for accessing memory areas shared among different processes running on the OS kernel or one or more other OS kernels, such as, for example, on one or more CDs 44 in the CN cluster 4 (shown in FIG. 3).

The IO device table can include, for example, information about the status or availability of memory space in each CRA 40, information about the assignment of memory space in each storage device 46 to the process, the status of IO operations being executed by the process, the mount point for the VIFS, and the location of the storage space used for the process.

The process table can include process parameters, such as, for example, a unique identifier for the process running on the OS kernel, an identifier of any parent, child or related processes running on other nodes in the CN cluster 4 (shown in FIG. 3) according to the application. The process table can include, for example, the status of the process when it is suspended, allowing the OS kernel to restart it later and still execute correctly. The process table can include the content of, for example, general-purpose registers (not shown) on the CD 44, as well as process status word, stack or frame pointers. During a context switch, the OS kernel can stop the process and allow another process to execute on the OS kernel, such as, for example, a process corresponding to another computing resource 42 or another process or section of code of the computing resource 42. The OS kernel can be arranged to stop execution of the process, copy out the data for that process in hardware registers (not shown) in the CD 44 to its data structure (for example, PCB), and update the hardware registers with the data from the data structure of a new process. The copied-out data can be written to the storage device 46, such as, for example, to the storage space allocated to the VBB 50 on the storage device 46. Subsequently, the data stored in each such VBB 50 can be read from the storage device 46 and written to the storage system 6 (shown in FIG. 3). Each VBB can have a file path, such as, for example, "/mountVIFS," or any other suitable file path, as will be understood by those skilled in the art upon reading this disclosure.

The OS kernel can be loaded to the CD 44 at start-up and control start-up operations of the process corresponding to the computing resource 42, including, but not limited to, input or output requests from the process, or memory or processing time or space allocations for the process, including the creation or operation of the VBB 50 on the CRA 40. Once loaded and operational, the OS kernel can be arranged to receive system or function calls from the process, including, for example, the VBBC functional call, hardware-related services such as accessing the VBB 50, the local storage device 46 or a storage device 46 located on another CRA 40 in the CN cluster 4 (shown in FIG. 3).

Referring to the nonlimiting example in FIGS. 2 and 3, nodes N1, N3, N6, N31 and N32 can be allocated to operate as compute nodes in the CN cluster 4. The CN cluster 4 can be determined, and the selection or allocation of nodes made by the CRA allocation scheduler 34 (shown in FIG. 5) based on the CRA request received from the application at, for example, initialization. Each node in the node network 10, including the CN cluster 4, can be managed by the node manager (for example, 33, shown in FIG. 5).

The CN cluster can include a massively parallel compute node architecture of a large numbers of nodes that can perform, for example, millions of instructions per second (MIPS) or more, such as, for example, tens or hundreds of PFLOPS (peta-floating-point operations per second). Depending on the application, the rate of data flow generated by the CN cluster can far exceed the maximum rate of data input or write of the storage system 6 (shown in FIG. 3), such as, for example, tens, hundreds, or more times the maximum input data rate for the storage system.

Once an application job initializes its data structure, all participating compute nodes in the CN cluster (for example, nodes N1, N3, N31, N32, and N6, shown in FIGS. 2 and 3) can be interacted with and consulted about the status of their memory consumption to determine the storage requirements for the application processes and to calculate the amount of storage space that can be made available on the CRAs to create a VIFS on the fly. The amount of available storage space on each CRA 40 for creating a VBB 50 ("VBB capacity") can be determined by subtracting the memory required by the process on that node from the total available storage space on the storage device 46 on that node to calculate the VBB capacity for the node. The amount of storage space of the VIFS for the CN cluster can be calculated by adding all the VBB capacities of the nodes in the CN cluster.

For each node in the CN cluster, the VIFS system 30 (shown in FIG. 5) can determine whether a VBB 50 is needed for the application job, or whether the node can accommodate a VBB 50 based on the requested or forecasted utilization of memory in the storage device 46 (shown in FIGS. 2 and 3). The VIFS system 30 can be arranged to determine whether a VIFS is needed for a particular application job and, if so, to create and operate the VIFS. If it is determined that memory is fully utilized on a given node, or if the VBB 50 is not needed on the node, the application job can proceed with the computation phase on the CD 44 (shown in FIG. 2), without any changes.

The VIFS system 30 can be arranged to determine whether an application job requires a VIFS for the application processes to run with minimal or no idle time. The determination can be made, for example, based on the CRA request for the application job or once the application runs and initializes on the CN cluster.

If it is determined that the application job requires creation of a VIFS on the CN cluster, the VBBC function can be called (for example, from the local computing resource 42 in the CRA 40) and run to create the VBB 50 on the fly and in real-time on the storage device 46 on the node. The application processes running on the CRAs 40 in the CN cluster, can create the VIFS in the CN cluster on-demand, on the fly and in real-time. The VBBC function can receive a map of all CRAs in the CN cluster, including available free memory on each CRA 40, and return a mount point (for example, "/mountVIFS") that can be used for creating the VIFS, including providing a path for data output by the computing devices 44 in the CN cluster. The application can use the mount point information to update an output path to each VBB 50 in the VIFS 5 (shown in FIG. 3). The CDs 44 in the CN cluster 4 (shown in FIG. 3) can write data to the VIFS 5 using the output path. The CDs 44 can proceed with the computation phase, without any changes. At the end of the computation phase, the data can be transferred concurrently and in parallel from all VBBs in the VIFS to the final permanent destination in, for example, the storage system 6 (shown in FIG. 3) for the application job. At termination of the application job, the VIFS can be destroyed and the full storage capacity of the CN cluster made available to the next application to run on the nodes.

FIG. 3 shows a non-limiting example of the VIFS 5 that can be created on the fly in real-time for an application job that requires 5 nodes to run the application processes. In this example, a VBB 50 can be created or operated on the fly on each node of the CN cluster 4 to create or operate the VIFS 5. The VIFS 5 can operate as a bridge between the high-performance compute devices 44 in the CN cluster 4 and the much slower or lower bandwidth storage system 6, thereby minimizing any likelihood of a bottleneck occurring that could renders any CRA 40 in the CN cluster 4 idle, such as, for example, while data is transferred from the CN cluster 4 to the storage system 6. If a determination is made that a CRA 40 in the CN cluster 4 has insufficient storage space to accommodate creation or operation of the VBB 50, then the CN cluster can be scaled-out by adding or allocating one or more additional nodes to the CN cluster, and the workload can be distributed or redistributed across the expanded set of CRAs 40 on the scaled-out cluster, thereby freeing up storage space to create or operate the VIFS 5 on the cluster. It is noted that in certain circumstances an application process running on a particular CRA 40 in the CN cluster 4 may not need a VBB 50 on that node, or there might not be adequate memory space on the storage device 46 for the VBB 50, in which case the VIFS can be created on the fly with less than all CRAs 40 in the CN cluster 4 having the VBB 50.

Figure 4:
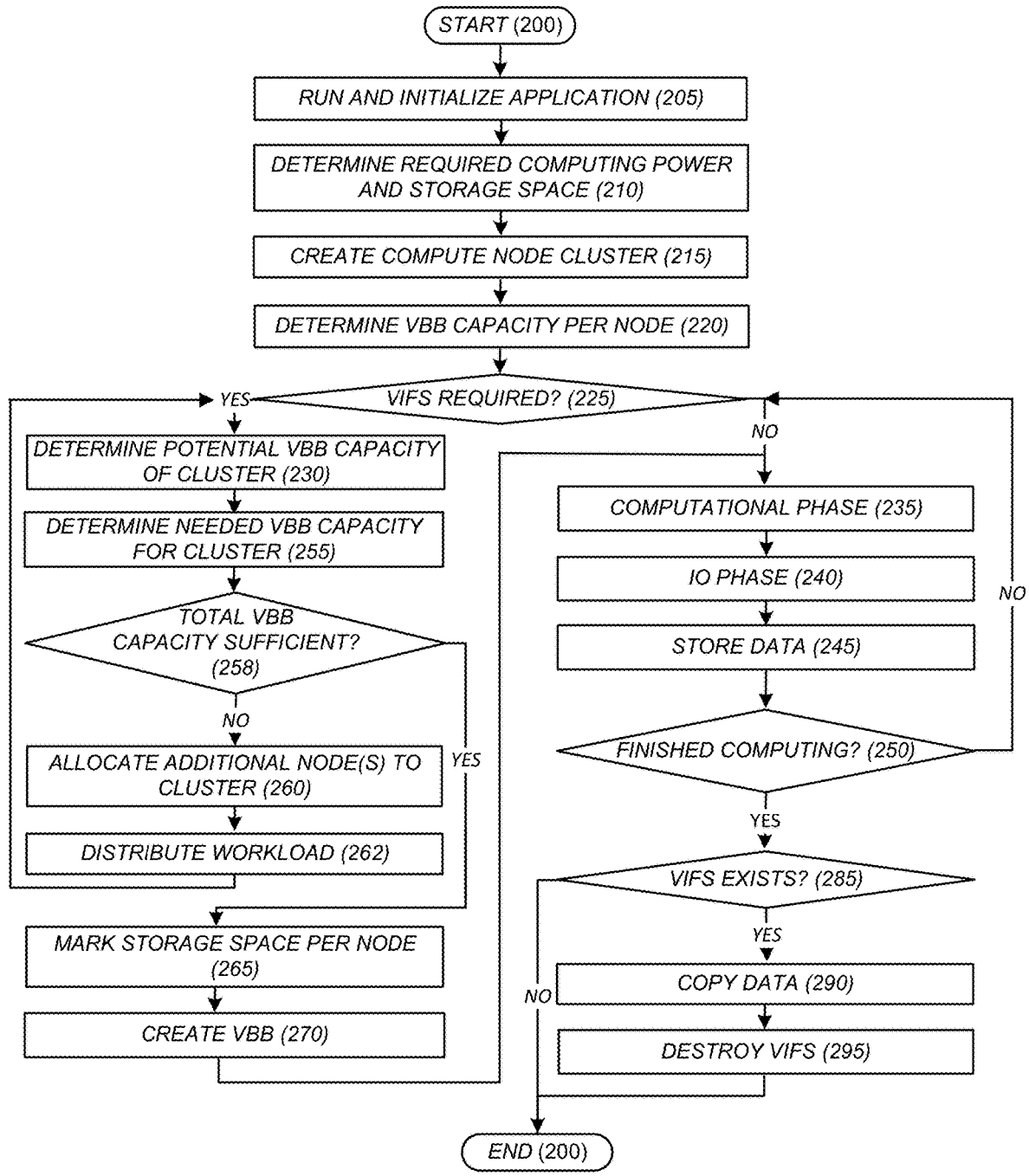
FIG. 4 shows a nonlimiting embodiment of a process for creating the virtual filesystem on the fly in the compute node cluster, including creating a plurality of virtual burst buffers on the fly in the cluster.

FIG. 4 shows a non-limiting embodiment of a VIFS creation and operation process 200 for creating a VIFS such as the VIFS 5 (shown in FIG. 3) on the fly and in real-time to transfer data between the high-performance computing devices 44 in the CN cluster and the slower or lower-bandwidth storage system (for example, 6, shown in FIG. 3). The process 200 can be carried out by the CRA 40 (shown in FIGS. 2 and 3), which, as previously noted, can include the VIFS system 30 (shown in FIG. 5).

It is noted that, in describing steps in the process 200, reference is made repeatedly to the examples or embodiments shown in FIG. 1-3 or 5 with the understanding that the process 200 is not limited to any of these examples or embodiments.

FIG. 5 shows a nonlimiting embodiment of the VIFS system 30, constructed according to the principles of the disclosure. The VIFS system 30 can be provided at one or more nodes in a compute node network, such as, for example, the node network 10 (shown in FIG. 2). The VIFS system 30 can be included in the CRA 40 (shown in FIG. 2 or 3), in which case the computing resource 42 can be located in the storage device 46 or running on the CD 44. The VIFS system 30 can be included in each node in the CN cluster 4 (shown in FIG. 3) to provide a distributed VIFS, or it can be included in one or more nodes in the CN cluster, or outside the cluster in the node network 10, to provide a centralized VIFS. The VIFS system 30 can be arranged to perform the process 100 (shown in FIG. 1) or process 200 (shown in FIG. 4).

Each of the components in the VIFS system 30 can include a computing device or a computing resource. Any one or more of the components in the VIFS system 30 can be assembled or formed as a single device or module, which can include one or more computing devices or computing resources. The VIFS system 30 can include a server. The VIFS system 30 can include the computing device (CD) 44, storage device (SD) 46, a network interface 31, an input-output (I/O) interface 32, the node manager 33, the CRA allocation scheduler 34, a virtual intermediary filesystem (VIFS) manager 35, a virtual burst buffer (VBB) generator 36 and a database 37. The VIFS system 30 can include a bus 38, which can be connected to each of the components in the system by a communication link.

Any one or more of the components in the VIFS system 30 can include a computing device or a computing resource that is separate from the computing device 44, as seen in FIG. 5, or integrated or integratable in the computing device 44.

The VIFS system 30 can include a non-transitory computer-readable storage medium that can hold executable or interpretable computer program code or instructions that, when executed by, for example, the computing device 44, cause the steps, processes or methods in this disclosure to be carried out, including the process 100 (shown in FIG. 1) or the process 200 (shown in FIG. 4). The computer-readable storage medium can be included in the storage device 46, such as, for example, in the hard disk drive (HDD) 46C or random-access-memory (RAM) 46B.

The storage device (SD) 46 can include a read-only-memory (ROM) 46A and the RAM 46B. A basic input-output system (BIOS) can be stored in the non-volatile memory 46A, which can include, for example, a ROM, an EPROM, or an EEPROM. The BIOS can contain the basic routines that help to transfer information between components in the VIFS system 30, such as during start-up. The RAM 46B can include a high-speed RAM such as static RAM for caching data.

The storage device 46 can include the operating system (OS) for the VIFS system 30 (or CRA 40, shown in FIG. 2). The computer resource 42 (shown in FIG. 2) can be stored in the storage device 46 and accessed by the computing device 44 to execute an HPC application job according to the computer resource 42, which, as previously noted, can include a section of code or instructions of the HPC application.

The HDD 46C can include an enhanced integrated drive electronics (EIDE) drive or a serial advanced technology attachments (SATA) drive. The HDD 46C can be arranged for external use in a suitable chassis (not shown). The HDD 46C can be connected to the bus 38 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The storage device 46 can include a non-transitory computer-readable storage medium that can store data, data structures, or computer-executable instructions or code. The storage device 46 can accommodate the storage of any data in a suitable digital format. The storage device 46 can include one or more computing resources 42, such as, for example, program modules or software applications that can be used to execute aspects of the architecture included in this disclosure.

One or more computing resources 42 (shown in FIG. 2 or 3) can be contained in the storage device 46, including, for example, an operating system (OS), an application program, an API, a program module, a VBBC function, or program data. One or more of the computing resources 42 can be cached in the RAM 46B as executable sections of computer program code or retrievable data.

The network interface 31 can be connected to or configured to connect to each CRA 40 in the node network 10 (shown in FIG. 2) or another network (not shown). The network interface 31 can be arranged to connect to a node outside the node network 10. The network interface 31 can include a wired or a wireless communication network interface (not shown) or a modem (not shown).

The I/O interface 32 can receive commands or data from any of the components in the VIFS system 30 or an external CRA 40. The I/O interface 32 can be arranged to connect to or communicate with any of the components, including, for example, the computing device 44, storage device 46, node manager 33, CRA allocation scheduler 34, VIFS manager 35, VBB generator 36 or database 37. The received commands or data can be forwarded from the I/O interface 32 as instruction or data signals via the bus 38 to any component in the VIFS system 30.

The database 37 can include a storage device, such as, for example, a database server, or a storage module. The database 37 can be included in the storage device 46. The database 37 can be arranged to store data for each node in the node network 10 (shown in FIG. 2) that can be allocated for inclusion in the CN cluster, including computer resource asset (CRA) inventory data, virtual burst buffer (VBB) inventory data, or application job data. The database 37 can include, for example, a map of all computing resource assets, including each CRA 40 in the node network, and a data output mount point for the storage device 46 in each CRA 40. The CRA inventory data can include, for example, memory capacity, device specifications of the CD 44 and storage device 46, configuration data, IP address data, MAC address data, policy data, or rules.

The database 37 can be arranged to be accessed by any one or more of the components in the VIFS system 30. The database 37 can be arranged to receive queries and, in response, retrieve specific data or records or portions of data or records based on the queries. The database 37 can include a DBMS that can interact with the components in the VIFS system 30. The DBMS can be arranged to interact with computer resource assets outside of the VIFS system 30. The DBMS can include, for example, SQL, MySQL, Oracle, Postgress, Access, or Unix. The database 37 can include a relational database.

The node manager 33 can be arranged to create, edit or maintain an inventory of all compute nodes in the node network 10, including the nodes that are allocated or operated in the CN cluster for an application job. The node manager 33 can be arranged to create, update or maintain a map of each CRA 40 in the node network 10. The node manager 33 can be arranged to manage the inventory of all such nodes in the node network 10 and to interact with each such node. The node manager 33 can be arranged to receive a CRA request, such as, for example, from an HPC application, which can include one or more processes running on one or more nodes in the node network 10. The CRA request can include operating constraints, such as, for example, the number of nodes N it might need to execute the application. The CRA request can include a request, such as, for example, "2,737 processors needed."

The CRA allocation scheduler 34 can interact with the node manager 33 and allocate one or more nodes (for example, nodes N1, N3, N31 and N32, shown in FIG. 2) in the node network 10 (shown in FIG. 2) for the CN cluster (for example, 4, shown in FIG. 3) and run the processes of the application job. The CRA allocation scheduler 34 can be included in or integrated with the node manager 33 as a single device or module, or provided as separate device or module, as seen in FIG. 5.

The nodes in the CN cluster can be selected or allocated by the CRA allocation scheduler 34 based on the CRA request for the application job, including, for example, the operating constrains for the application processes. The CRA allocation scheduler 34 can be arranged to, when an application job starts running on the CN cluster and the storage space footprint is determined for the job workload, calculate the maximum memory needed on each node in the cluster for the application job to run. The CRA allocation scheduler 34 can be arranged to interact with the VIFS manager 35, such that free memory on each node in the cluster is softly marked as the maximum potential VBB capacity on that node. The aggregate (or sum) of each VBB capacity in the CN cluster can be aggregated by the VIFS manager 35 to create a VIFS on the fly for the workload processes running on the CN cluster.

After the storage space in each node in the CN cluster is marked, the VIFS manager 35 can be arranged to map each VBB (for example, 50, shown in FIGS. 2 and 3) into a single namespace to create a the VIFS (for example, "/mount-VIFS"). For instance, the VIFS manager 35 can be arranged to mount all nodes that have been marked to the namespace for the cluster to a single namespace for the application job. The VIFS manager 35 can be arranged to interact or consult with each node in the cluster and learn the potential storage space, including VBB capacity, on each node in the cluster. In creating a single namespace for the VIFS on the fly and in real-time, the VIFS manager 35 can be arranged to aggregate the VBB capacity on each node in the cluster to determine the VIFS capacity for the cluster. In a nonlimiting embodiment, the VIFS manager 35 can be arranged to equally utilize storage space on all nodes during data write/read cycles to balance VIFS capacity on all nodes.

The CRA allocation scheduler 34 can be arranged to manage the resources and services needed by the application job, including, for example, breaking a large HPC application job into smaller subjobs, distributing the workload across the nodes and running each application process in parallel on the nodes in the CN cluster. In an alternative embodiment, this operation can be performed by the node manager 33. Since the various application processes can communicate with each other, the nodes in the cluster can generate large amounts of data, which can be transferred to the VIFS (for example, 5, shown in FIG. 3) during an IO phase of the processes to allow each CRA 40 in the cluster to proceed with the next computational phase, without delay. Upon completion of all processes of the application job, the CRA allocation scheduler 34 can release all nodes (for example, nodes N1, N3, N31 and N32, shown in FIG. 2) in the CN cluster to the node manager 33 (shown in FIG. 5).

The VIFS manager 35 can be arranged to interact with and consult each CRA 40 in the CN cluster and calculate the amount of memory that can be reserved or availed on each storage device 46 to create a VBB 50 on that node. In the embodiment of the solution comprising the centralized VIFS, the VIFS manager 35 can be arranged to calculate the amount of memory that can be reserved or availed on each CRA 40 in the CN cluster to create a VBB 50 on each such node. In the embodiment of the solution comprising the distributed VIFS, the VIFS manager 35 can be arranged to calculate the amount of memory that can be reserved or availed on each node comprising the VIFS system 30 to create the VBB 50 on that node; each VIFS manager 35 in the distributed VIFS can interact with or consult with each other VIFS manager 35 in the CN cluster to determine the storage space needed for the VBB 50 at each node in the cluster, as well as the overall VIFS storage capacity needed.

Once an application job initializes its data structure and the requisite number or nodes are allocated and reserved by the CRA allocation scheduler 34 (for example, based on the CRA request for the application), the VIFS manager 35 can consult all participating nodes in the CN cluster about their memory consumption and calculate the amount of memory it can avail from each CRA 40 in the CN cluster to create the VIFS. The VIFS manager 35 can be arranged to create, determine or receive a map of all nodes, including the CRA 40 and available memory on each node, in the CN cluster. The VIFS manager 35 can be arranged to return a mount point for each VBB 50 that can be used for the VIFS.

If, after consulting all nodes in the CN cluster, the VIFS manager 35 determines that a VBB 50 cannot be accommodated in a particular node, for example, because the memory on the node is fully utilized, or if it is determined that a VBB 50 (or VIFS) is not needed for the application process running on the node, the VIFS manager 35 can allow the application process on that node to proceed normally, without any changes.

If, after consulting all nodes in the CN cluster, the VIFS manager 35 determines that a VBB 50 is needed for the application process running on a node, the VBB generator 36 can be arranged to call the VBBC function to create the VBB 50 on that node. The VBB generator 36 can be included in or integrated with the VIFS manager 35 in a single device or module, or provided as separate devices or modules, as seen in FIG. 5. The VBB 50 can be created on the fly and in real-time, for example, by the VBB generator 36, by marking free memory in the storage device 46 for the VBB 50, which can store intermediate data from the CD 44 to the marked storage space on the storage device 46 during the IO phase of the application process and transfer the data from that storage space (VBB 50) to the storage system (for example, 6, shown in FIG. 3) during the computation phase of the application process. The VBB generator 36 can use the mount point data from the VIFS manager 35 to configure or update the output path for the data read/write from/to the VBB 50 in the storage device 46. The VBB generator 36 can be arranged to, after the application job terminates and all data is transferred from the VBB 50 to the storage system 6 (shown in FIG. 3), destroy the VBB 50.

In a centralized implementation of the VIFS system 30 (shown in FIG. 5), the VIFS manager 35 can be arranged to build a global view of the VBB capacity (or free memory) on each node on the fly at runtime of the application job using, for example, a message exchange protocol such as MPI. The VIFS manager 35 can determine how much of the VBB capacity on each node to allocate for the VBB 50 on that node. For example, the VIFS manager 35 can be arranged to allocate 100% or less of the VBB capacity on a node to the VBB 50, such as, for example, 90%, 80%, or any other percentage of the VBB capacity that might be appropriate, depending on the application, as will be understood by those skilled in the art after reading this specification.

Referring to FIG. 4, an application, such as, for example, an HPC application, an IO kernel application, or any other application that can benefit from the solution, can initialize its data structure on the CRA 40 (shown in FIGS. 2 and 3) of one or more nodes in the node network 10 (shown in FIG. 2) (Step 205). As previously noted, the CRA 40 can include the VIFS system 30 (shown in FIG. 5). Based on, for example, a CRA request for the application, the CRA allocation scheduler 34 (shown in FIG. 5) can determine the computing power and storage space required by the application job (Step 210) and reserve and allocate compute nodes (for example, nodes N1, N3, N31, N33, and N6, shown in FIGS. 2 and 3) in the node network 10 (shown in FIG. 2) to create or operate the CN cluster (for example, CN cluster 4, shown in FIG. 3) and run the application job (Step 215). When the application job starts and the application's storage (or memory) footprint is determined, the required computing power and storage space can be determined for each node in the CN cluster, including the maximum storage space needed for each node for the application job to run. The remaining free storage space on each node in the cluster, as determined by, for example, the VIFS system 30 (shown in FIG. 5), can be used as a potential VBB capacity on that node (Step 220).

The workload for the application job can be distributed across all of the nodes in the CN cluster to run the application processes in parallel on the cluster. The nodes in the CN cluster should, in the aggregate, have sufficient computing resource assets, including computing power and storage space, to handle the application workload, including all job processes.

The nodes in the CN cluster can be interacted with or consulted, for example, by the VIFS manager 35 (shown in FIG. 5) on each node in the cluster, to determine the potential VBB capacity on each node (Step 220). In this regard, the VIFS manager 35 can call the VBBC function to receive a map of all CRAs (or nodes) in the CN cluster, including the potential VBB capacity on each node. A determination can be made, for example, by the VIFS manager 35, whether a VIFS needs to be created for the application processes running on the CN cluster (Step 225). If it is determined that a VIFS needs to be created for the job (YES at Step 225), then the VIFS manager 35 can be arranged to receive a mount point from the VBBC function for the VBB 50 on each storage device 46 that has a potential VBB capacity that is greater than a threshold VBB capacity and determine the maximum potential VBB capacity for each node and the overall maximum potential storage capacity for the VIFS on the cluster (Step 230).

If it is determined that a VIFS is not required for the particular application job running on the cluster (NO at Step 225), then the CN cluster can be permitted to proceed with the computation phase (Step 235) and IO phase (Step 240) of the application processes, outputting the resultant data from the CN cluster to the storage system (for example, 6, shown in FIG. 3) (Step 245).

The threshold VBB capacity for the storage device 46 can be set to any value between 0% and 100% of the storage capacity for that storage device 46, including, for example, 0%. It is noted that the threshold VBB capacity can be the same across all nodes in the CN cluster, or it can be made to differ such that the threshold VBB capacity of a particular node in the CN cluster differs from that of one or more other nodes in the same cluster.

If it is determined that a VIFS is needed to run the application job on the CN cluster to avoid interruptions or idle time, which might otherwise result due to, for example, performance gaps between the compute nodes (for example, CD 44) in the cluster and the back-end storage system (YES at Step 225), then the total potential aggregate VBB capacity on all nodes in the CN cluster can be determined by adding the potential VBB capacity of each node to determine the total potential aggregate VBB capacity of the CN cluster (Step 230). After determining the VIFS is needed (YES at Step 225), the total VBB capacity needed to run the application workload can be determined (Step 255), which should be sufficient to run the application job without any interruptions to the application processes due to bottlenecking of dataflow between the CN cluster and storage system. The total VBB capacity needed to run the job workload can be determined, for example, based on the CRA request for the application. The VBB capacity value determined (in Step 230) for the total potential aggregate VBB capacity for the cluster can be compared to the VBB capacity value determined (in Step 255) for the VBB capacity needed by the job workload to determine whether the total potential aggregate VBB capacity is sufficient to run the application job (Step 258).

In an alternative nonlimiting embodiment of the solution, instead of determining the total potential VBB capacity for the cluster (Step 230) and comparing that value (Step 258) to the VBB capacity needed to run the application job on the cluster without interruption or idle periods of time, the VBB capacity determined at each node (Step 220) can be compared to the VBB capacity needed by the application process running on that node (Step 258). In other words, in this embodiment of the solution, the VBB capacity at each node in the cluster can be compared to the VBB capacity needed by the application process running at that same node (Step 258).

If it is determined that the total potential aggregate VBB capacity is less than the total VBB capacity needed to run the application job on the cluster (NO at Step 258), or, in the alternative embodiment, if it is determined the VBB capacity on a node is less than the VBB capacity needed to run the application process running on that node (NO at Step 258), then one or more additional nodes in the node network 10 (shown in FIG. 2) can be allocated and added to the CN cluster (Step 260) and the job workload distributed or redistributed across the expanded or scaled-out CN cluster (Step 262).

If it is determined that the total potential aggregate VBB capacity is equal to or greater than the total VBB capacity needed to run the application workload on the cluster (YES at Step 258), or, in the alternative embodiment, if it is determined the VBB capacity on the node is equal to or greater than the VBB capacity needed to run the application process running on that node (YES at Step 258), then storage space on each node in the CN cluster having a potential VBB capacity greater than the threshold VBB capacity can be marked for inclusion in the VIFS (Step 265), a VBB 50 can be created at each such storage space (Step 270) and the application processes can be permitted to proceed with the computation phase (Step 235).

In Step 270, the output path for, for example, the corresponding computing device 44 located at the same (or a different) node as the VBB 50 (shown in FIGS. 2 and 3) can be updated, for example, by the VBB generator 36 (shown in FIG. 5), with the mount point address of the location on the storage device 46 for the VBB 50. In a nonlimiting embodiment, the output path for a computing device 44 located on another node in the CN cluster can be updated with the mount point address of the location for the VBB 50, thereby allowing a computing device 44 on another node to store intermediate data to the storage device 46 and, more specifically, the storage space on the SD 46 allocated for the VBB 50.

After the application processes complete the computation phase (Step 235), the processes can output data during the IO phase (Step 240), in parallel and concurrently, to each respective storage area on the storage devices 46 allocated for the VBB 50 on that CRA 40 (Step 245), thereby writing the data in parallel and concurrently to the VIFS for the application job.

A determination can be made whether the application job has completed running on the CN cluster (Step 250). If it is determined that the job has completed (YES at Step 250), then a determination can be made whether the VIFS exists (Step 285) otherwise (NO at Step 250) the application job can be permitted to proceed to the next computational phase (Step 235). If, however, it is determined that the VIFS does not exist (NO at Step 285), then all the nodes in the CN cluster can be released, for example, to the node manager 33 (shown in FIG. 5).

If it is determined that the application job has completed (YES at Step 250) and the VIFS exists (YES at Step 285), then: data can be copied concurrently and in parallel from the VBB 50 on each SD 46 in the VIFS to the storage system (Step 290); the VIFS can be destroyed (Step 295); and, all the nodes in the CN cluster can be released, for example, to the node manager 33 (shown in FIG. 5). In destroying the VIFS, each VBB 50 can be destroyed by, for example, resetting each CRA 40 in the cluster to its default settings and releasing the CRA 40 to the node manager 33.

In the nonlimiting embodiment comprising the distributed implementation of the VIFS system 30 (shown in FIG. 5), each node in the CN cluster can be arranged to interact with or consult all the other nodes in the cluster and determine the potential VBB capacity for that node. In other words, the VIFS system 30 can be arranged on each node in the cluster to consult the other nodes and decide, within the application space, how much memory space it can avail as VBB capacity to create the VBB on that node. All the VBBs, in the aggregate, can make up the VIFS for the application job running on the CN cluster.

In the nonlimiting embodiment comprising the centralized implementation of the VIFS system 30 (shown in FIG. 5), the VIFS system 30 on each node in the cluster can build a global view of the VBB capacity on each node on the fly at runtime of the application. The VIFS system 30 can build the global view on each node by, for example, using any messaging exchange protocol, such as, for example, MPI. The VIFS system 30 on each node can interact and consult with the other nodes in the CN cluster to coordinate and determine how much storage space on each node should be allocated as potential VBB capacity.

Regardless whether the solution includes the centralized or distributed implementation of the VIFS system 30 (shown in FIG. 5), and regardless of the policies used by the VIFS system 30, the storage space on each node in the CN cluster can be softly marked for the potential maximum VBB capacity that can be employed on the node without interfering with the application space. In either implementation, the amount of storage space allocated to the VBB by each node can be variable; one node in the CN cluster can contribute a large portion of its memory, such as, for example, 70% or more of its storage space, while another node in the same cluster can contribute nothing—that is, 0% of its storage space. The storage space allocated to the VBB 50 on any given node can be anywhere between 0% and 100% of total storage at that node.

Each node in the CN cluster (for example, CN cluster 4, shown in FIG. 3) can include memory space in its storage device (for example, storage device 46, shown in FIG. 2 or 5) that can be exclusively reserved for the particular job reserving it. Initially, the memory or storage space in each node in the CN cluster can be substantially, if not entirely unused and available to store data. Once the application runs and initializes its data structure, each participating node in the CN cluster can be consulted about its memory consumption and available storage space to calculate the amount of memory that can be made available to create a VIFS (for example, VIFS 5, shown in FIG. 3). The storage space in each CRA 40 (shown in FIG. 2) or VIFS system 30 (shown in FIG. 5) should be sufficient to accommodate data structures needed for computational processing (for example, numerical crunching) by the computing device (CD) 44 and the VBB 50 to store intermediary data during the IO phase of the application process. The storage space allocation can be done at the beginning of the application's execution, and the storage can be recycled during computational processing. The application processes can require nominal extra memory for auxiliary data generated during computational processing.

The following is a nonlimiting example of benefits and advantages that can be provided by the solution to two HPC applications.

Example

The first application can include a parallel IO kernel and the second application can include a massively parallel HPC application. In this example, the CN cluster can include eighty-eight (88) compute nodes, an allocated VIFS size of 2.7 terabytes (T) total with 31.4 GB on each node, and a block size of 4 MB. The IO performance for the first application can be improved by the VIFS by more than seven (7) times; and, the IO performance for the second application can be improved by the VIFS by nearly twenty (20) times. Given the high cost of separate storage nodes or HPS devices, the solution provides can provide considerable savings in resources.

| Application | Throughput (MB/s) Without VBB | Throughput (MB/s) With VBB | Improvement |
|---|---|---|---|
| IO Kernel | 634.973 | 4682.716 | 7.37× |
| Massively Parallel HPC Application | 152.518 | 3019.85 | 19.8× |

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a network. The backbone can include an Ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communicating device," as used in this disclosure, means any computing device, hardware, or computing resource that can transmit or receive data packets, instruction signals or data signals over a communication link. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The term "compute node cluster" or "CN cluster," as used in this disclosure, means a set of connected computers that work together as a single much more power computer. Each node in a CN cluster can be assigned the same application job or task. Each node in the CN cluster can be connected to each other node in the CN cluster through a network, such as, for example, a high-speed local area network. Each node in CN cluster can include one or more processors (for example, 1, 2, 3, 4 or more processors) and each processor can include one or more cores (for example, 1, 2, 3, 4 or more cores).

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (μC), a central processing unit (CPU), a graphic processing unit (GPU), an application specific integrated circuit (ASIC), a compute core, a compute machine, a general purpose computer, a super computer, a personal computer, a laptop computer, a palmtop computer, a notebook computer, a desktop computer, a workstation computer, a server, a server farm, a computer cloud, or an array or system of processors, μCs, CPUs, GPUs, ASICs, general purpose computers, super computers, personal computers, laptop computers, palmtop computers, notebook computers, desktop computers, workstation computers, or servers.

The terms "computer resource asset" or "computing resource asset," as used in this disclosure, means a computing resource, a computing device or a communicating device, or any combination thereof.

The term "computer-readable medium" or "computer-readable storage medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "computing resource," as used in this disclosure, means software, a software application, a web application, a web page, a computer application, a computer program, computer code, machine executable instructions, firmware, or a process that can be arranged to execute on a computing device or a communicating device.

The terms "connectivity" or "connectivity link," as used in this disclosure, means a communication link or any combination of communication links that connects two or more nodes, carrying data packets between the nodes. A data packet can include an Internet Protocol (IP) data packet. A data packet can include an instruction signal that, when received by a communicating device can cause the device to carry out a predetermined function or task. The data packet can include a data packet signal that, when received by a communicating device can be implemented in carrying out a predetermined function or task or processed to render information.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and variations thereof, as used in this disclosure, mean "including, but not limited to," unless expressly specified otherwise.

The term "node," as used in this disclosure, means a physical or virtual location in a network that comprises or can comprise a computer resource asset.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for creating a virtual intermediary filesystem on the fly and in real-time on a compute node cluster having a plurality of compute nodes that are running or scheduled to run an application job, the method comprising:
   initializing a data structure for the application job on a computing resource asset in a compute node network;
   allocating a plurality of compute nodes in the compute node network to the compute node cluster;
   reserving the compute node cluster, including the allocated compute nodes, to the application job;
   distributing the application job across the compute node cluster;
   determining memory utilization by the application job on the compute node cluster;
   determining a potential free memory space on a storage device on each of the allocated compute nodes;
   marking the potential free memory space on each respective storage device on each of the allocated compute nodes; and
   mapping the marked potential free memory space on each respective storage device into a single namespace to create the virtual intermediary filesystem on-demand and in real-time,
   wherein the virtual intermediary filesystem is arranged to store data in parallel and concurrently from a plurality of computing devices on the compute node cluster and output the stored data to a storage system,
   wherein the plurality of computing devices output the data at a rate that is greater than a maximum write or read data rate of the storage system.

2. The method in claim 1, further comprising:
   adding the potential free memory space on the storage device on each of the allocated compute nodes to determine a total free memory space on the compute node cluster.

3. The method in claim 2, further comprising:
   determining an aggregate free memory space needed to create the virtual intermediary filesystem for the application job.

4. The method in claim 3, further comprising:
   comparing the total free memory space on the compute node cluster to the aggregate free memory space needed to create the virtual intermediary filesystem for the application job.

5. The method in claim 4, further comprising:
   allocating an additional compute node in the compute node network to the compute node cluster to create an expanded compute node cluster when the total free memory space on the compute node cluster is less than the aggregate free memory space needed to create the virtual intermediary filesystem for the application job.

6. The method in claim 5, further comprising:
   redistributing the application job across the expanded compute node cluster.

7. The method in claim 1, further comprising:
   writing the data in parallel and concurrently from the plurality of computing devices to the virtual intermediary filesystem during an input-output phase of the application job.

8. The method in claim 1, further comprising:
   reading data in parallel and concurrently from the virtual intermediary filesystem; and
   outputting the read data to the storage system during a computation phase of the application job.

9. The method in claim 1, further comprising:
   destroying the virtual intermediary filesystem when the application job finishes running on the compute node cluster.

10. The method in claim 1, further comprising:
    releasing all compute nodes in the compute node cluster after the application job finishes running on the compute node cluster.

11. A non-transitory computer readable storage medium, having stored thereon, instructions that when executed by a computing device on a compute node cluster having a plurality of compute nodes that are running or scheduled to run an application job, cause the computing device to perform operations comprising:
    initializing a data structure for an application job running or scheduled to run on the compute node cluster;
    allocating a plurality of nodes in a node network to the compute node cluster;
    reserving the compute node cluster, including the allocated nodes, to the application job;
    distributing the application job across the compute node cluster;
    determining memory utilization by the application job on the compute node cluster;
    determining a potential free memory space on a storage device on each of the allocated nodes;
    marking the potential free memory space on each respective storage device on each of the allocated nodes; and
    mapping the marked potential free memory space on each respective storage device into a single namespace to create the virtual intermediary filesystem on-demand and in real-time,
    wherein the virtual intermediary filesystem is arranged to store data in parallel and concurrently from a plurality of computing devices on the compute node cluster and output the stored data to a storage system,
    wherein the plurality of computing devices output the data at a rate that is greater than a maximum write or read data rate of the storage system.

12. The non-transitory computer readable storage medium in claim 11, wherein the instructions, when executed by the computing device, cause the computing device to perform a further operation comprising:
    adding the potential free memory space on the storage device on each of the allocated nodes to determine a total free memory space on the compute node cluster.

13. The non-transitory computer readable storage medium in claim 12, wherein the instructions, when executed by the computing device, cause the computing device to perform a further operation comprising:

determining an aggregate free memory space needed to create the virtual intermediary filesystem for the application job.

14. The non-transitory computer readable storage medium in claim 13, wherein the instructions, when executed by the computing device, cause the computing device to perform a further operation comprising:
comparing the total free memory space on the compute node cluster to the aggregate free memory space needed to create the virtual intermediary filesystem for the application job.

15. The non-transitory computer readable storage medium in claim 14, wherein the instructions, when executed by the computing device, cause the computing device to perform a further operation comprising:
allocating an additional node in the node network to the compute node cluster to create an expanded compute node cluster when the total free memory space on the compute node cluster is less than the aggregate free memory space needed to create the virtual intermediary filesystem for the application job.

16. The non-transitory computer readable storage medium in claim 15, wherein the instructions, when executed by the computing device, cause the computing device to perform a further operation comprising:
redistributing the application job across the expanded compute node cluster.

17. The non-transitory computer readable storage medium in claim 11, wherein the instructions, when executed by the computing device, cause the computing device to perform a further operation comprising:
writing the data in parallel and concurrently from the plurality of computing devices to the virtual intermediary filesystem during an input-output phase of the application job.

18. The non-transitory computer readable storage medium in claim 11, wherein the instructions, when executed by the computing device, cause the computing device to perform further operations comprising:
reading data in parallel and concurrently from the virtual intermediary filesystem; and
outputting the read data to the storage system during a computational phase of the application job.

19. The non-transitory computer readable storage medium in claim 11, wherein the instructions, when executed by the computing device, cause the computing device to perform a further operation comprising:
destroying the virtual intermediary filesystem when the application job finishes running on the compute node cluster.

20. The non-transitory computer readable storage medium in claim 11, wherein the instructions, when executed by the computing device, cause the computing device to perform a further operation comprising:
releasing all nodes in the compute node cluster after the application job finishes running on the compute nod cluster.

21. A system for creating a virtual intermediary filesystem on the fly and in real-time on a compute node cluster having a plurality of compute nodes that are running or scheduled to run an application job, wherein each of the plurality of compute nodes has a computing device and a storage device, the system comprising:
a computing resource asset arranged to:
initialize a data structure for the application job in a node network;
allocate a plurality of nodes in the node network to the compute node cluster;
reserve the compute node cluster, including the allocated nodes, to the application job;
distribute the application job across the compute node cluster;
determine memory utilization by the application job on the compute node cluster;
determine a potential free memory space on the storage device on each of the allocated nodes;
mark the potential free memory space on each respective storage device on each of the allocated nodes; and
map the marked potential free memory space on each respective storage device into a single namespace to create the virtual intermediary filesystem on-demand and in real-time,
wherein the virtual intermediary filesystem is arranged to store data in parallel and concurrently from a plurality of computing devices on the compute node cluster and output the stored data to a storage system, and
wherein the plurality of computing devices output the data at a rate that is greater than a maximum write or read data rate of the storage system.

* * * * *